US012701561B2

(12) United States Patent
Zhou et al.

(10) Patent No.: US 12,701,561 B2
(45) Date of Patent: Aug. 4, 2026

(54) COMMON BEAM DIRECTION INDICATION FOR SINGLE-TARGET AND MULTI-TARGET COMMUNICATIONS

(71) Applicant: QUALCOMM Incorporated, San Diego, CA (US)

(72) Inventors: Yan Zhou, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 17/663,364

(22) Filed: May 13, 2022

(65) Prior Publication Data

US 2022/0369301 A1 Nov. 17, 2022

Related U.S. Application Data

(60) Provisional application No. 63/188,845, filed on May 14, 2021.

(51) Int. Cl.
*H04W 72/044* (2023.01)
*H04W 72/23* (2023.01)

(52) U.S. Cl.
CPC ......... *H04W 72/046* (2013.01); *H04W 72/23* (2023.01)

(58) Field of Classification Search
CPC .. H04W 72/046; H04W 72/23; H04B 7/0695; H04B 7/088; H04L 5/0035; H04L 5/0048
See application file for complete search history.

(56) References Cited

U.S. PATENT DOCUMENTS

| 2023/0216565 A1* | 7/2023 | Kwak | H04B 7/088 |
| | | | 375/267 |
| 2023/0239125 A1* | 7/2023 | Yi | H04B 7/06968 |
| | | | 370/329 |
| 2023/0363005 A1* | 11/2023 | Cirik | H04W 72/23 |
| 2024/0235774 A1* | 7/2024 | Nimbalker | H04L 5/0051 |
| 2024/0237042 A9* | 7/2024 | Park | H04W 80/02 |

* cited by examiner

*Primary Examiner* — Mandish K Randhawa
(74) *Attorney, Agent, or Firm* — Harrity & Harrity, LLP

(57) ABSTRACT

Wireless communications systems and methods can use common transmission configuration indication (TCI) states to indicate beam directions for single-target and multi-target communications. A wireless communication device is configured to communicate a configuration for a plurality of transmission configuration indications (TCIs). The wireless communication device is further configured to communicate a first activation of a first TCI of the plurality of TCIs for a first signal, and a second activation of a second TCI of the plurality of TCIs for a plurality of second signals. The wireless communication device is further configured to communicate, based on the first TCI, the first signal, and communicate, based on the second TCI, at least one of the plurality of second signals.

30 Claims, 10 Drawing Sheets

1100

Transmit, to a user equipment (UE), a configuration for a plurality of transmission configuration indications (TCIs) ~1102

Transmit, to the UE, a first activation of a first TCI of the plurality of TCIs for a first signal ~1104

Transmit, to the UE, a second activation of a second TCI of the plurality of TCIs for a plurality of second signals ~1106

Communicate, based on the first TCI, the first signal ~1108

Communicate, based on the second TCI, at least one of the plurality of second signals ~1110

300

| TCI State | RS Resource | QCL Type |
|:---:|:---:|:---:|
| 0 | SSB resource for SSB #n | {A, D} |
| 1 | CSI-RS resource for CSI-RS #k | {A} |
| ... | ... | ... |
| M-1 | SSB resource for SSB #p | {A,D} |

400

| TCI State | RS Resource | QCL Type |
|:---:|:---:|:---:|
| 0 | DL channel 1, DL RS 1 | {D} |
| 1 | DL channel 2, DL channel 3 | {D} |
| 2 | UL channel 1, UL RS 1 | {D} |
| ... | ... | ... |
| M | DL channel M, UL channel M | {D} |

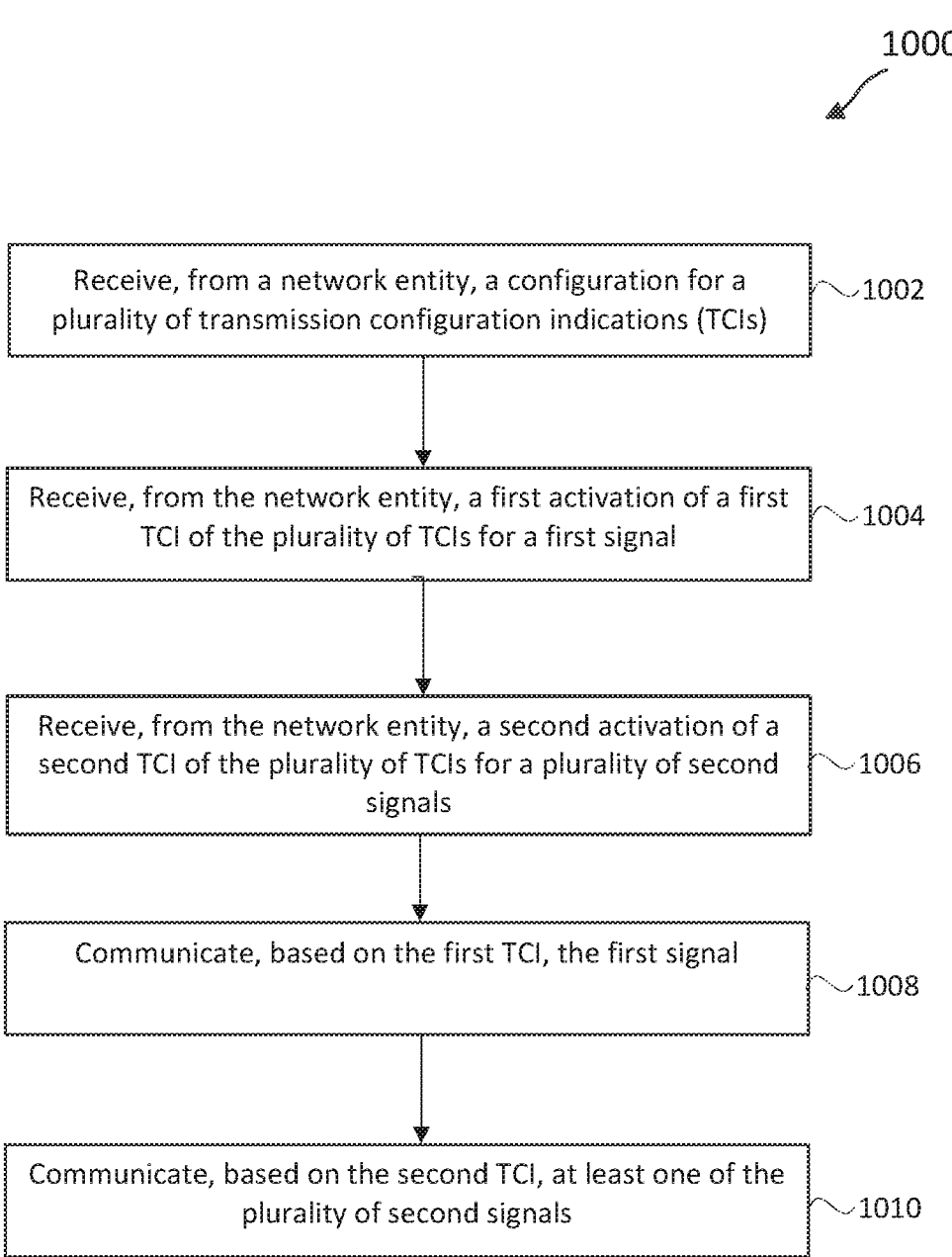

1000

Receive, from a network entity, a configuration for a plurality of transmission configuration indications (TCIs) ~1002

Receive, from the network entity, a first activation of a first TCI of the plurality of TCIs for a first signal ~1004

Receive, from the network entity, a second activation of a second TCI of the plurality of TCIs for a plurality of second signals ~1006

Communicate, based on the first TCI, the first signal ~1008

Communicate, based on the second TCI, at least one of the plurality of second signals ~1010

FIG. 10

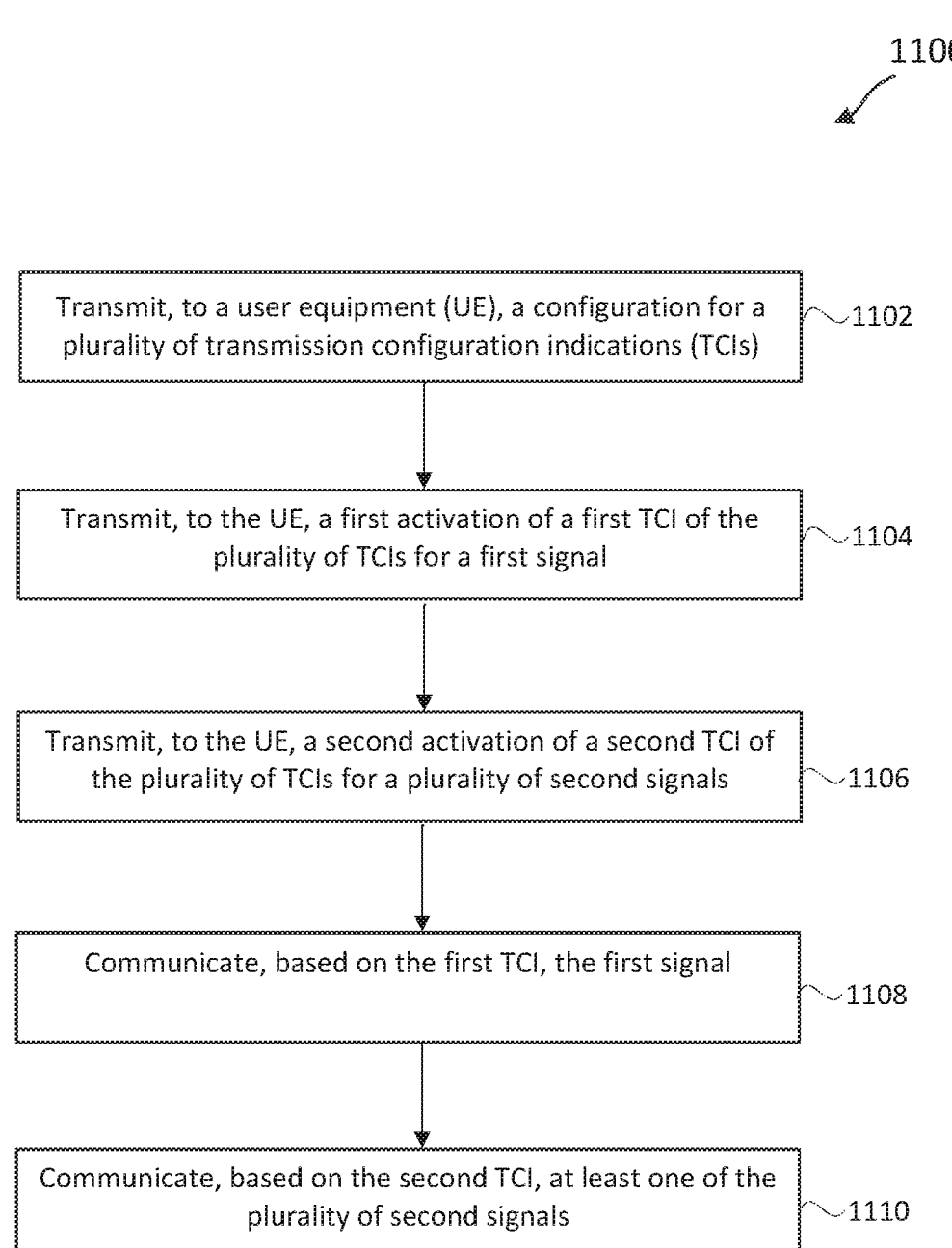

1100

Transmit, to a user equipment (UE), a configuration for a plurality of transmission configuration indications (TCIs) — 1102

Transmit, to the UE, a first activation of a first TCI of the plurality of TCIs for a first signal — 1104

Transmit, to the UE, a second activation of a second TCI of the plurality of TCIs for a plurality of second signals — 1106

Communicate, based on the first TCI, the first signal — 1108

Communicate, based on the second TCI, at least one of the plurality of second signals — 1110

FIG. 11

COMMON BEAM DIRECTION INDICATION FOR SINGLE-TARGET AND MULTI-TARGET COMMUNICATIONS

CROSS-REFERENCE TO RELATED APPLICATIONS

The present Application for Patent claims the benefit of, and priority to, U.S. Provisional Patent Application No. 63/188,845, filed May 14, 2021, the entirety of which is incorporated by reference herein.

TECHNICAL FIELD

The present disclosure is directed to wireless communication systems and methods. The present disclosure includes beam indications for single-target and multi-target communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For instance, NR is designed to provide a lower latency, a higher bandwidth or a higher throughput, and a higher reliability than LTE. NR is designed to operate over a wide array of spectrum bands, for instance, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may configure a UE with quasi-co-location (QCL) related information for receiving DL communications from the BS or transmitting UL communications to the BS. Two antenna ports are quasi-co-located when a signal received from one antenna port experiences a same channel or at least a similar channel as another signal received from the other antenna port. QCL can be at various levels. For instance, QCL can be in terms of doppler shift, doppler spread, average delay, delay spread, and/or receive spatial parameter.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method for wireless communication performed by a wireless communication device includes communicating a configuration for a plurality of transmission configuration indications (TCIs). The method further includes communicating a first activation of a first TCI of the plurality of TCIs for a first signal. The method further includes communicating a second activation of a second TCI of the plurality of TCIs for a plurality of second signals. The method further includes communicating, based on the first TCI, the first signal, and communicating, based on the second TCI, at least one of the plurality of second signals.

One aspect of the present disclosure includes a wireless communication device. The wireless communication device includes a transceiver; and a processor in communication with the transceiver and configured to cause the wireless communication device to: communicate a configuration for a plurality of transmission configuration indications (TCIs); communicate a first activation of a first TCI of the plurality of TCIs for a first signal; communicate a second activation of a second TCI of the plurality of TCIs for a plurality of second signals; communicate, based on the first TCI, the first signal; and communicate, based on the second TCI, at least one of the plurality of second signals.

One aspect of the present disclosure includes a non-transitory computer-readable medium having program code recorded thereon. The non-transitory computer-readable medium includes: code for causing a wireless communication device to communicate a configuration for a plurality of transmission configuration indications (TCIs); code for causing the wireless communication device to communicate a first activation of a first TCI of the plurality of TCIs for a first signal; code for causing the wireless communication device to communicate a second activation of a second TCI of the plurality of TCIs for a plurality of second signals; code for causing the wireless communication device to communicate, based on the first TCI, the first signal; and code for causing the wireless communication device to communicate, based on the second TCI, at least one of the plurality of second signals.

One aspect of the present disclosure includes a wireless communication device. The wireless communication device includes: means for communicating a configuration for a plurality of transmission configuration indications (TCIs); means for communicating a first activation of a first TCI of the plurality of TCIs for a first signal; means for communicating a second activation of a second TCI of the plurality of TCIs for a plurality of second signals; means for communicating, based on the first TCI, the first signal; and means for communicating, based on the second TCI, at least one of the plurality of second signals.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects, it should be understood that such exemplary aspects can be implemented in various devices, systems, and methods.

BRIEF DESCRIPTION OF THE DRAWINGS

FIG. 10 is a flow diagram illustrating a beam indication communication method according to one or more aspects of the present disclosure.

FIG. 11 is a flow diagram illustrating a beam indication communication method according to one or more aspects of the present disclosure.

DETAILED DESCRIPTION

Figure 1:
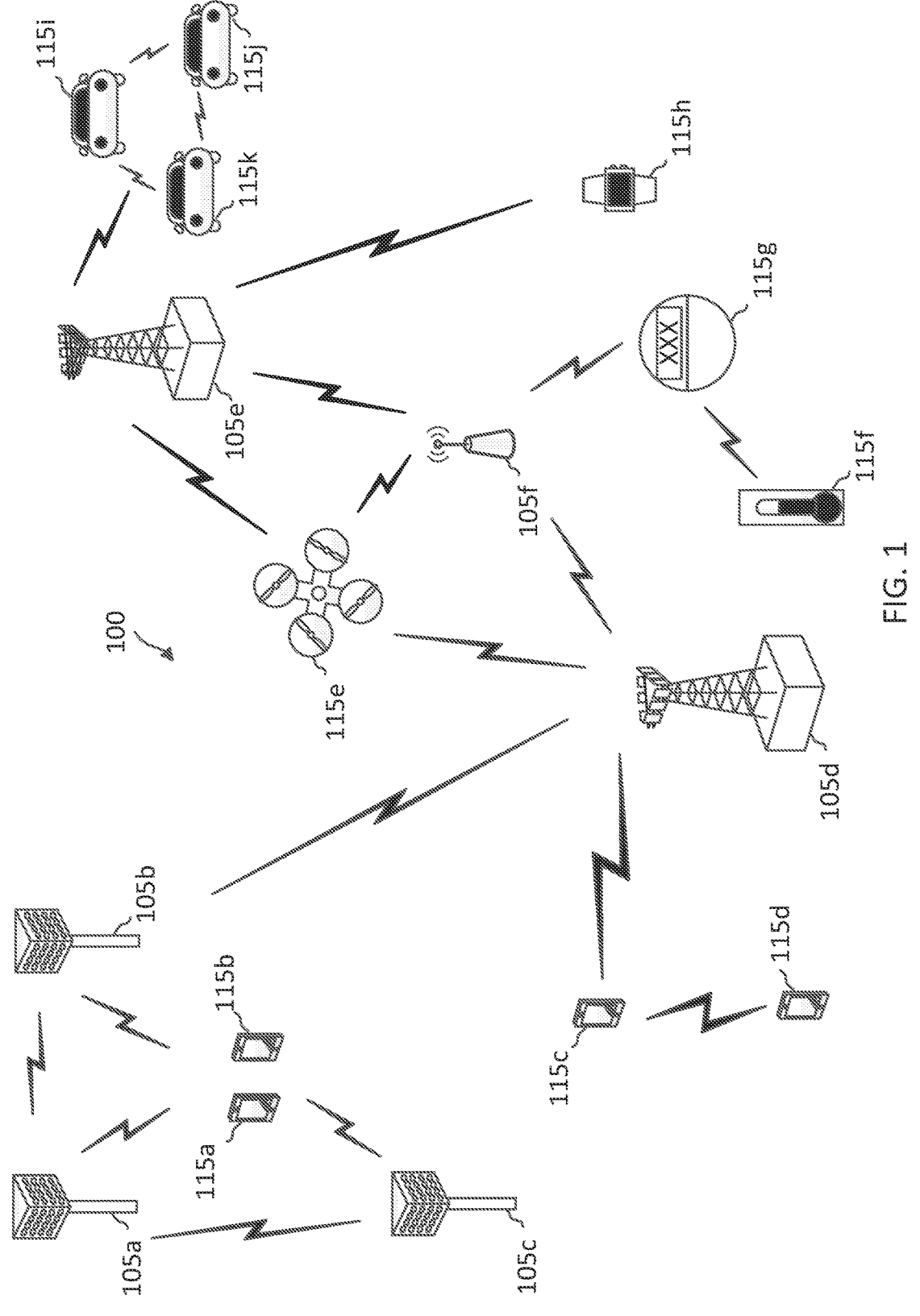
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For instance, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1 M nodes/km$^2$), ultra-low complexity (e.g., ~10 s of bits/sec), ultra-low energy (e.g., —10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., — 1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For instance, in various outdoor and macro coverage deployments of less than 3 GHz FDD/TDD implementations, subcarrier spacing may occur with 15 kHz, for instance over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For instance, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For instance, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For instance, a method may be implemented as part of a system, device, apparatus, and/or as instructions stored on a computer readable medium for execution on a processor or computer. Furthermore, an aspect may comprise at least one element of a claim.

In some aspects, a wireless communication device, such as a BS or a UE, may use directional beamforming to increase signal power and signal characteristics for improved coverage and reduced communication failures. The BS and the UE may use beam-specific reference signals to establish a beam pair (DL and UL) that can be used to transmit and receive DL/UL communications. In some aspects, the BS may indicate to the UE which beams are used for communication using transmission configuration indications (TCIs), which provide information about a beam and the channels/reference signals (RSs) the beam can be used for. The BS may configure the UE with a list or pool of TCIs, which may be referred to as TCI states, and their associated channels/RSs. In some instances, a TCI pool may include a range of TCI identifier (IDs), where each TCI ID may reference a configuration that associates beam information with certain signals (e.g., UL channel signal, DL channel signal, UL reference signal, DL reference signal). Further, the BS may dynamically request the UE to utilize a different DL beam and/or a different UL beam for communication. The BS may indicate the DL and/or UL beam by transmitting an indication of one or more TCIs and its associated channel/RS resources. That is, a TCI may include a TCI state corresponding to a particular beam.

The BS may activate a given TCI for a single-target communication, or for a set of multi-target communications. For single-target communications, the BS indicates, for each channel or reference signal, which TCI to use. For multi-target communications, the BS indicates a TCI that can be used for a plurality of channels/RSs. In some aspects, a UE may be configured with unified TCI states for multi-target communications, as explained above. A unified TCI state may include, for instance, a joint DL/UL common TCI state indicating a common beam for at least one DL channel and at least one UL channel, a joint DL/UL common TCI state indicating a common beam for at least one DL reference signal and at least one UL reference signal, a separate DL common TCI state indicating a common beam for at least two DL channels, a separate DL common TCI state indicating a common beam for at least two DL reference signals, a separate UL common TCI state indicating a common beam for at least two UL channels, and/or a separate UL common TCI state indicating a common beam for at least two UL reference signals. The DL channels may include PDSCH, PDCCH, and/or PBCH. The UL channels may include PUCCH and/or PUSCH. The DL reference signals may include SSBs and/or CSI-RSs. The UL reference signals may include SRSs.

A unified TCI state may be activated using downlink control information (DCI) and/or media-access control-control elements (MAC-CEs), which indicates whether the unified TCI state is a joint DL/UL common TCI, a separate DL common TCI, or a separate UL common TCI. Once activated, the joint or separate TCI state is applied for all the corresponding resources indicated in the TCI configuration for that TCI state. Other TCI state frameworks may be categorized as single-target indications, or multi-target beam indications. Multi-target TCI state indications may include the unified TCI states described above. Single target beam indications are activated for each individual channel or RS, and can be used without a separate TCI activation. For example, single-target beam indications for CSI-RS and spatial relation for SRS may be used without a separate TCI activation.

In some aspects, it may be desirable to provide for such single-target indications, which do not require a separate activation, and multi-target indications, which may involve transmitting a separate activation to indicate for which resources a TCI can be used. However, it may be undesirable to configure a UE with multiple different sets of TCIs (e.g., TCI pools) or spatial filters for direction beamforming, as this would potentially cause more demand in memory consumption at the UE. Accordingly, it may be advantageous to provide for either single-target or multi-target communications using a single set of TCIs or spatial filters for directional beamforming.

Accordingly, the present disclosure illustrates various aspects to allow for single-target and multi-target communications based on a single set of TCIs or spatial filters for directional beamforming. For the purposes of the present disclosure, the term "TCI" may refer to a TCI state, which will be further described below. In an exemplary aspect, a BS may be configured to configure a UE with a single set of TCIs, and activate a TCI using a TCI activation, which may include transmitting a MAC-CE and/or a DCI indicating the activated TCI and its associated channels and/or reference signals. In some aspects, a first activation may indicate that the TCI is associated with a first single-target resource, and a second activation may indicate that the TCI is associated with a multi-target resource. In some aspects, the first and second activation may be transmitted simultaneously, or at different times. In some aspects, the UE may be configured to use the same TCI simultaneously for single-target and multi-target communications. For instance, the UE may receive an activation for a certain TCI state for single-target communication, and may receive another activation for the same TCI state to be used for multi-target communication while the TCI state is being activated for single-target communication, or vice versa. In other aspects, the UE may be configured to use the TCI for single-target and multi-target communications, but not simultaneously. For example, the UE may be configured to use the TCI for a single-target communication based on a first activation, and use the same TCI for a multi-target communication based on a subsequent second activation. That is, the UE may receive a deactivation of the TCI for single-target communication before receiving the second activation. Alternatively, the UE may receive an indication switching an association of the TCI with a single-target resource to multiple target resources.

Accordingly, aspects of the present disclosure advantageously provide a simplified and efficient TCI framework in which single-target and multi-target communications can be performed using a single set of TCIs. Thus, the memory consumption of the UE can be reduced since multiple groups of TCI states do not need to be configured in the UE for the different types of communications. However, it will also be understood that multiple sets of TCIs may be used in the schemes provided below, with similar advantages.

FIG. 1 illustrates a wireless communication network 100 according to one or more aspects of the present disclosure. The network 100 may be a 5G network. The network 100 includes a number of BSs 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

In some aspects, the term "base station" (e.g., the base station 105) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the term "base station" or "network entity" may refer to one device configured to perform one or more functions, such as those described herein in connection with the base stations 105. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are instances of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are instances of various machines configured for communication that access the network 100. The UEs 115i-115k are instances of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an instance of a gNB or an access node controller (ANC)) may interface with the core network through backhaul links (e.g., NG-C, NG-U, etc.) and may perform radio configuration and scheduling for communication with the UEs 115. In various cases, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for instance, about 10. Each slot may be further divided into mini-slots. In a FDD mode, simultaneous UL and DL transmissions may occur in different frequency bands. For instance, each subframe includes a UL subframe in a UL frequency band and a DL subframe in a DL frequency band. In a TDD mode, UL and DL transmissions occur at different time periods using the same frequency band. For instance, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For instance, each DL or UL subframe may have pre-defined regions for transmissions of reference signals, control information, and data. Reference signals are predetermined signals that facilitate the communications between the BSs 105 and the UEs 115. For instance, a reference signal can have a particular pilot pattern or structure, where pilot tones may span across an operational BW or frequency band, each positioned at a pre-defined time and a pre-defined frequency. For instance, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some instances, the random access procedure may be a four-step random access procedure. For instance, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some instances, the random access preamble, the RAR, the connection request, and the connection response can be referred to as message 1 (MSG1), message 2 (MSG2), message 3 (MSG3), and message 4 (MSG4), respectively. In some instances, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For instance, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In some aspects, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For instance, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for instance, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). After receiving the DL data packet, the UE 115 may transmit a feedback for the DL data packet to the BS 105. In some instances, the UE 115 may transmit the feedback on an acknowledgment resource. The feedback may be an acknowledgement (ACK) indicating that reception of the DL data packet by the UE 115 is successful (e.g., received the DL data without error) or may be a negative-acknowledgement (NACK) indicating that reception of the DL data packet by the UE 115 is unsuccessful (e.g., including an error or failing an error correction). In some aspects, if the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For instance, the BWP pair may include one BWP for UL communications and one BWP for DL communications.

Figure 2:
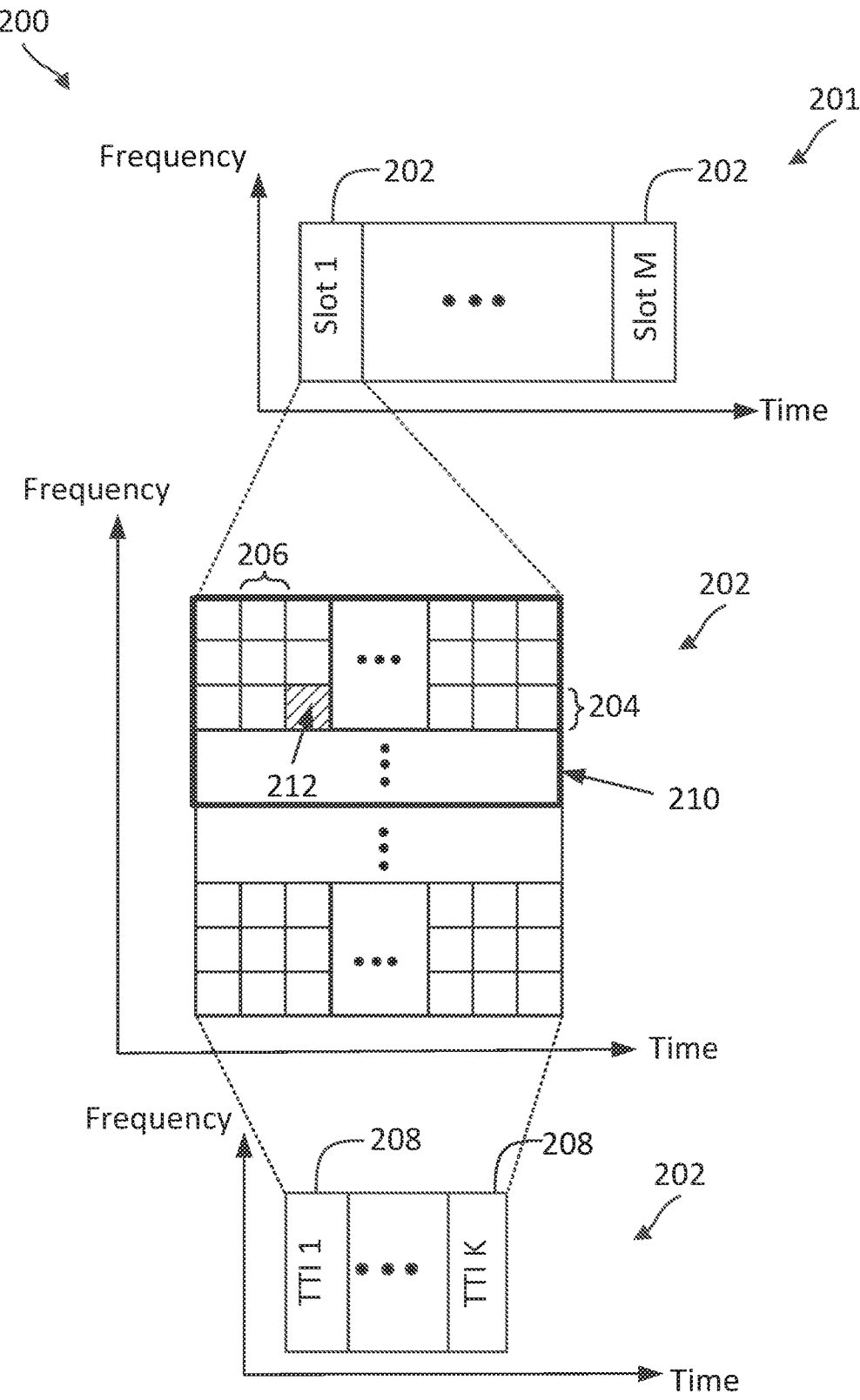
FIG. 2 is a timing diagram illustrating a radio frame structure according to one or more aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or TTIs 208. Each slot 202 may be time-partitioned into K number of TTIs 208. Each TTI 208 may include one or more symbols 206. The TTIs 208 in a slot 202 may have variable lengths. For example, when a slot 202 includes N number of symbols 206, a TTI 208 may have a length between one symbol 206 and (N−1) symbols 206. In some aspects, a TTI 208 may have a length of about two symbols 206, about four symbols 206, or about seven symbols 206. In some examples, the BS may schedule UE at a frequency-granularity of a resource block (RB) 210 (e.g., including about 12 subcarriers 204).

The BS 105 and the UE 115 may support a unified TCI framework based on DCI. In some aspects, the BS 105 may transmit a DCI indicating a unified TCI state. A unified TCI state may include, for instance, a joint DL/UL common TCI state indicating a common beam for at least one DL channel and at least one UL channel, a joint DL/UL common TCI state indicating a common beam for at least one DL reference signal and at least one UL reference signal, a separate DL common TCI state indicating a common beam for at least two DL channels, a separate DL common TCI state indicating a common beam for at least two DL reference signals, a separate UL common TCI state indicating a common beam for at least two UL channels, and/or a separate UL common TCI state indicating a common beam for at least two UL reference signals. The DL channels may include PDSCH, PDCCH, and/or PBCH. The UL channels may include PUCCH and/or PUSCH. The DL reference signals may include SSBs and/or CSI-RSs. The UL reference signals may include SRSs.

The BSs 105 and the UEs 115 may support joint and/or separate DL/UL beam indication(s) in the unified TCI framework. For instance, the BSs 105 and the UEs 115 may support Layer-1 (L1)-based beam indication using at least UE-specific (unicast) DCI or indicate joint or separate DL/UL beam indication from the active TCI states. In some aspects, the DCI may include a DCI in DCI format 1_1 or DCI format 1_2. For instance, the DCI format 1_1 and/or DCI format 1_2 may be reused for beam indication. The unified TCI framework may support a mechanism for the UE 115 to acknowledge successful decoding of a beam indication. In some aspects, the ACK/NACK of the PDSCH scheduled by the DCI carrying the beam indication may also be used as an ACK for the DCI.

The joint DL/UL common TCI state may include at least one source reference signal to provide a reference to the UE 115 for determining QCL and/or spatial filter information. The source reference signal(s) in M separate DL common TCI states may provide QCL information at least for UE-dedicated reception on PDSCH and for UE-dedicated reception on all or a subset of CORESETS in a CC, where M is a number greater than one. The source reference signal(s) in N separate UL common TCI states may provide a reference for determining a common UL transmission spatial filter(s) at least for dynamic-grant based PUSCH or configured-grant based PUSCH and/or all or a subset of dedicated PUCCH resources in a CC, where N is a number greater than one. In some aspects, the UL transmission spatial filter may apply to all SRS resources in resource set(s) configured for antenna switching, codebook-based UL transmissions, and/or non-codebook based UL transmissions.

In some aspects, a BS 105 may configure a UE 115 with TCI configurations, for example, via RRC configurations, to indicate association between beams and target signals. Examples of TCI configurations are provided in FIGS. 3 and 4. A target signal may be a certain channel signal (e.g., a PDCCH signal, a PDSCH signal, a PBCH signal, a PUCCH signal, a PUSCH signal) or a certain references signal (e.g., a CSI-RS, a SRS).

Figure 3:
FIG. 3 illustrates a transmission configuration indication (TCI) state table according to one or more aspects of the present disclosure.

FIG. 3 illustrates a TCI state table 300 according to one or more aspects of the present disclosure. In some aspects, the TCI state table 300 illustrates configuration of TCI states for single-target communications. In some aspects, the BS 105 may configure the UE 115 with the TCI state table 300. The UE may determine reference signal resource information and QCL information from the TCI state table 300. Each row in the TCI state table 300 provides references signal resource information and QCL type information for a certain TCI state. The references signal resource information may indicate the location of the time and/or frequency resources (e.g., symbols and/or subcarriers) where a BS 105 may transmit a respective references signal. The QCL type information may indicate a QCL type A, a QCL type B, a QCL type C, and/or a QCL type D. QCL type A may refer to doppler spread, doppler shift, delay spread, and/or average delay channel characteristics. QCL type B may refer to doppler shift and doppler spread channel characteristics. QCL type C may refer to average delay and doppler shift channel characteristics. QCL type D may refer to spatial receive parameters. Thus, when TCI state 0 defines the source reference signal(s) for a certain physical signal or channel (e.g., PDCCH), the UE 115 can configure its receive beam(s) in the same way it is configured for receiving the SSB with the index #n. Similarly, when TCI state 1 defines the source reference signal(s) for a certain physical signal or channel (e.g., PDCCH), the UE 115 can configure its receive beam(s) in the same way it is configured for receiving the CSI-RS with the index #k. When TCI state M−1 defines the source reference signal(s) for a certain physical signal or channel (e.g., PDCCH), the UE 115 can configure its receive beam(s) in the same way it is configured for receiving the SSB with the index #p. The UE 115 may configure its receive beams for UL transmission based on the TCI state(s) indicated by the BS 105. For instance, based on the TCI state table 300, the UE may transmit an UL communication using an SSB with index #n, CSI-RS with index #k, and SSB with index #p.

Figure 4:
FIG. 4 illustrates a TCI state table for multiple target communications according to one or more aspects of the present disclosure.

FIG. 4 illustrates a TCI state table 400 according to one or more aspects of the present disclosure. In particular, the TCI state table 400 illustrates configuration of TCI states for multi-target communications. In this regard, the TCI states shown in table 400 may include common joint and/or separate TCI states which can be used for a set of target channels and/or reference signals (RSs). In some aspects, the BS 105 may configure the UE 115 with the TCI state table 400. The UE may determine reference signal resource information and QCL information from the TCI state table 400. Each row in the TCI state table 400 provides references channel/signal resource information and QCL type information for each TCI state, which may be associated with TCI IDs having values from 0 to M. The channel/signal resource information may indicate the location of the time and/or frequency resources (e.g., symbols and/or subcarriers) where a BS 105 may transmit a respective references signal.

The QCL type information may indicate a QCL type A, a QCL type B, a QCL type C, and/or a QCL type D, as explained above.

In the table 400, each TCI may be configured either as a common joint TCI, or as a common separate TCI. For example, the TCIs in the table 400 having the TCI value M is a common joint TCI, and the other TCIs are common separate TCIs. In this regard, the TCIs having IDs 0-2 are shown as being associated with either multiple DL channels/signals, or multiple UL channels/signals. The TCI ID M is associated with a DL channel and a UL channel.

Figure 5:
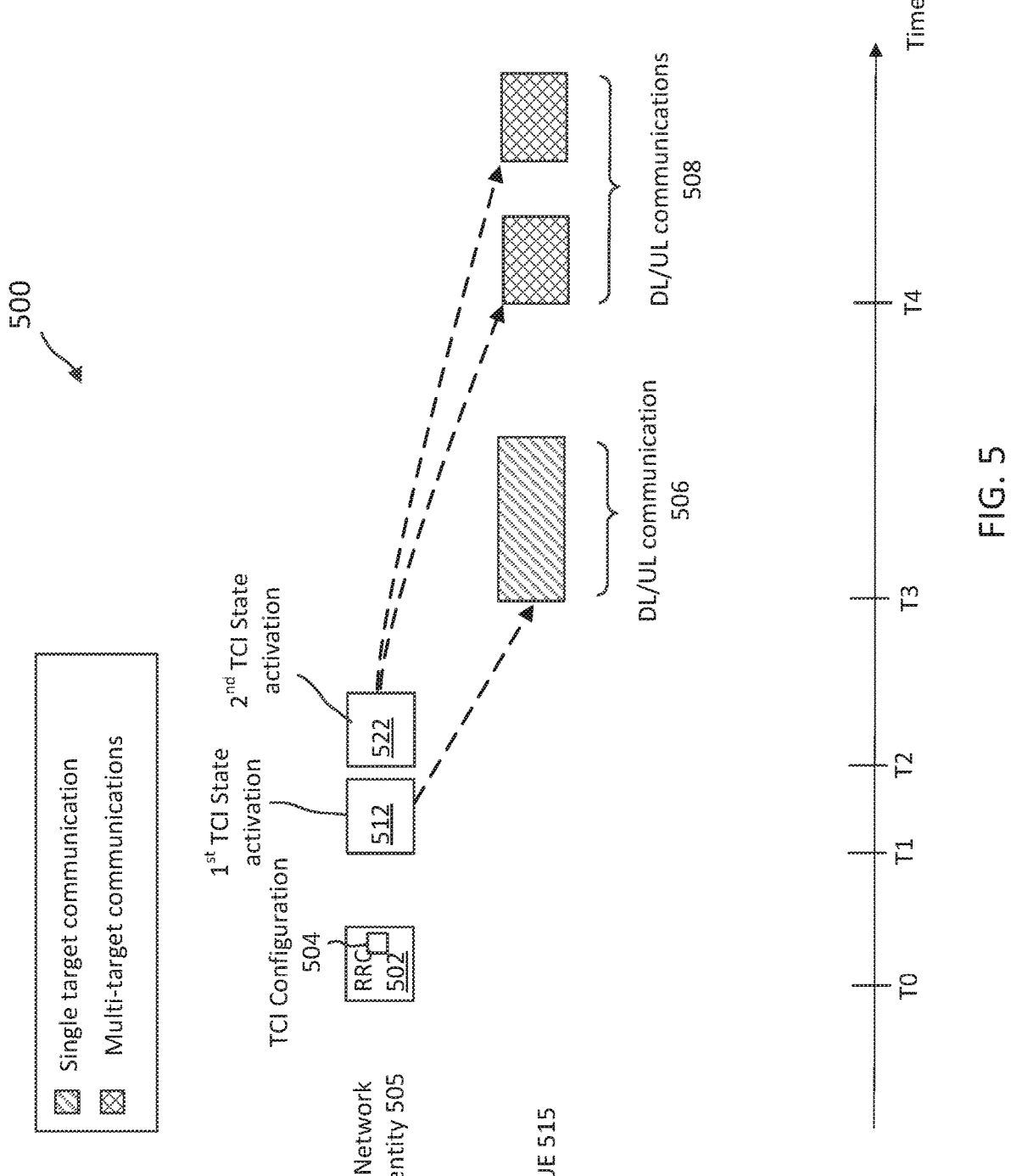
FIG. 5 illustrates a beam indication communication scheme according to one or more aspects of the present disclosure.
Figure 6:
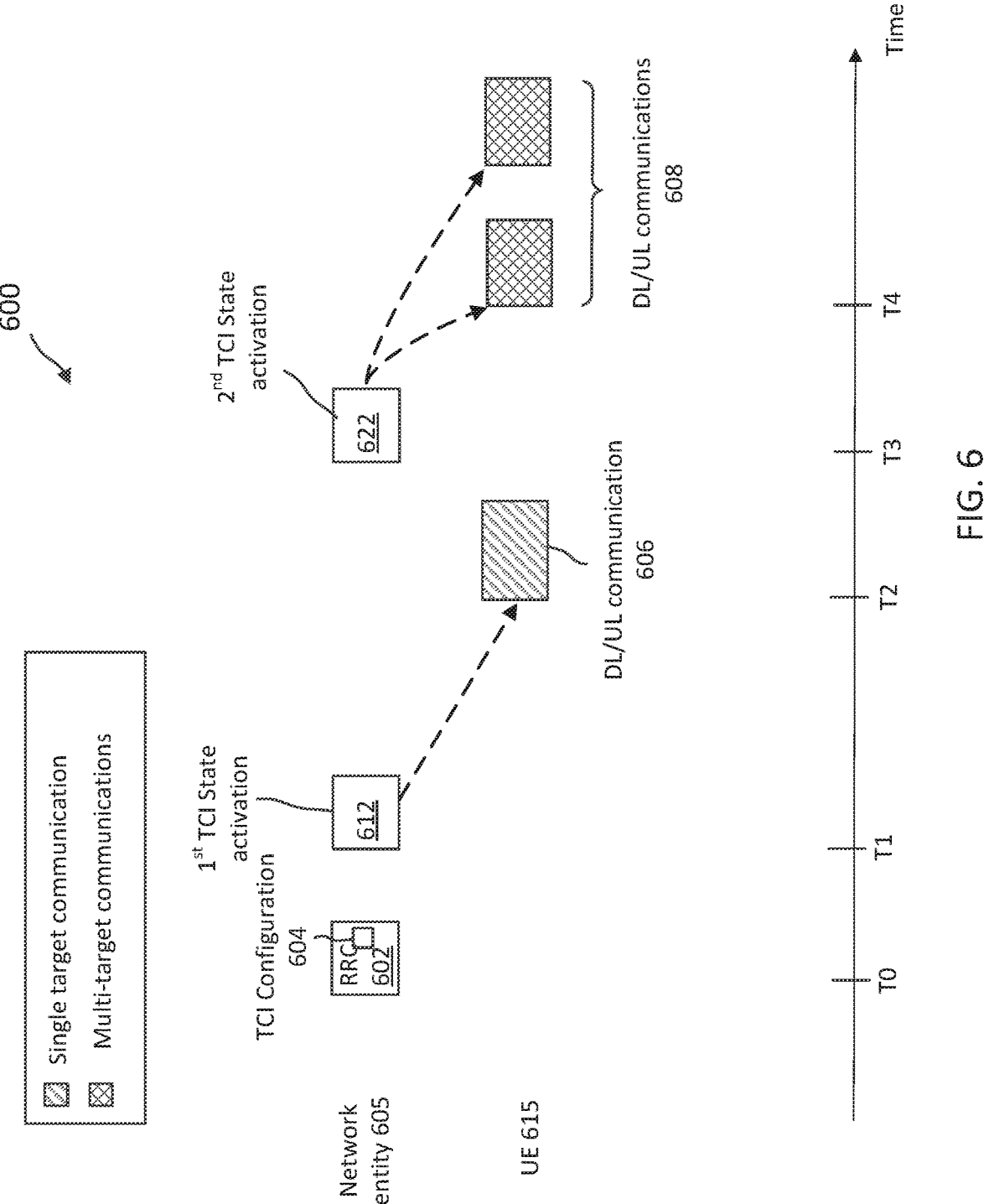
FIG. 6 illustrates a beam indication communication scheme according to one or more aspects of the present disclosure.
Figure 7:
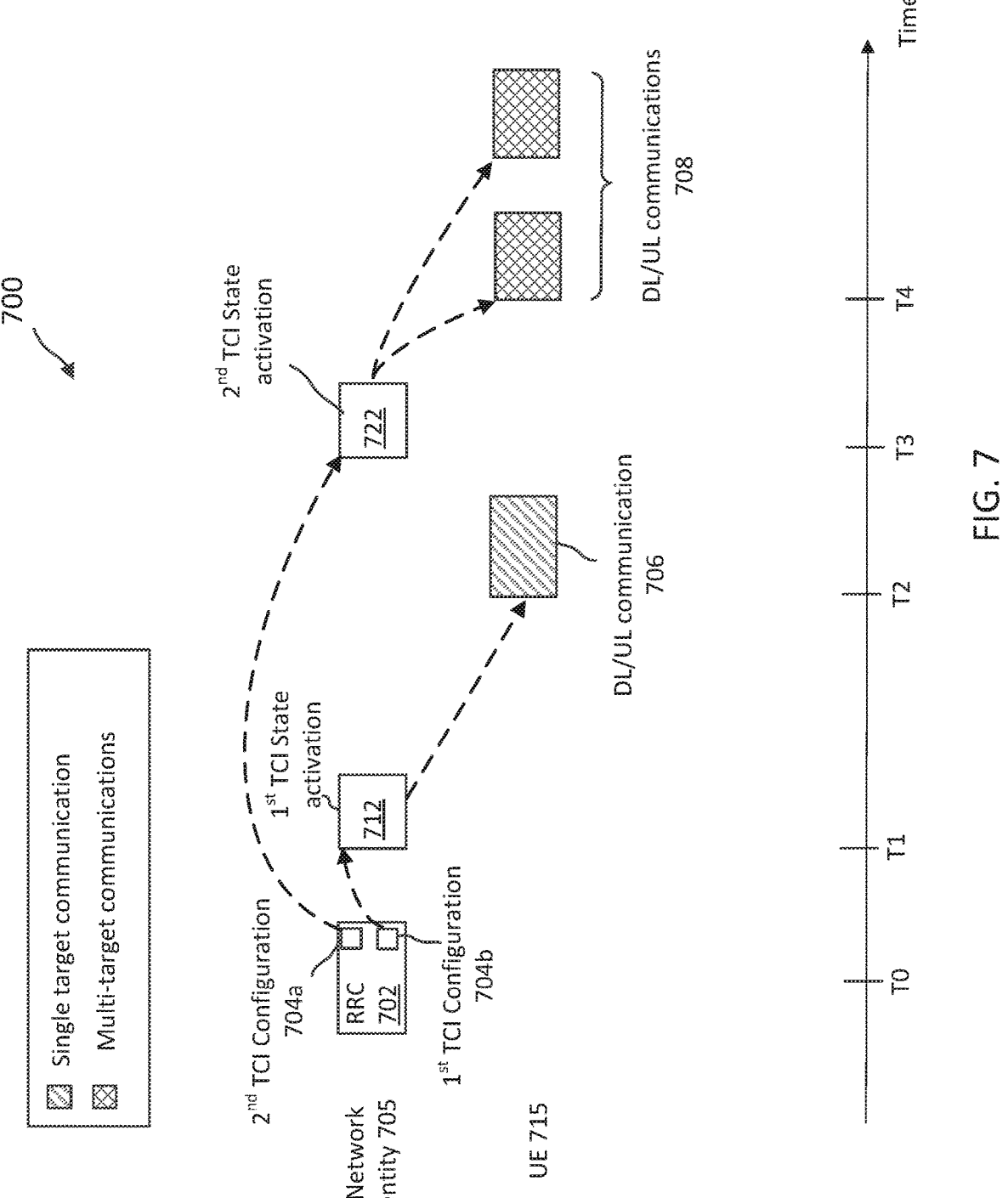
FIG. 7 illustrates a beam indication communication scheme according to one or more aspects of the present disclosure.

The TCI states shown in FIGS. 3 and 4 are discussed in relation to FIGS. 5-7 to illustrate communication schemes for using one or more TCI states for single-target and/or multi-target communications.

In some aspects, it may be desirable to provide for either single-target or multi-target communications. For example, it may be desirable to allow for a single-target communication, which can be activated in a beam indication without requiring a separate TCI activation, in addition to multi-target communications. In some aspects, a UE may be configured with unified TCI states for multi-target communications, as explained above. However, it may be undesirable to configure a UE with multiple sets of TCIs (e.g., TCI pools) or spatial filters for direction beamforming, as this would potentially cause more demand memory consumption at the UE. Accordingly, the present disclosure illustrates various aspects to allow for single-target and multi-target communications based on a single set of TCIs or spatial filters for directional beamforming. For the purposes of the present disclosure, the term "TCI" may refer to a TCI state, which are described above.

FIG. 5 illustrates a beam indication communication scheme 500 according to one or more aspects of the present disclosure. In the scheme 500, a network entity 505 and a UE 515 may operate in a channel over a frequency band. Although one network entity 505 and one UE 515 are shown, it should be understood that the scheme 500 may be employed by one or more network entities 505 and one or more UEs 515 in a network such as the network 100. The network entity 505 may correspond to and/or be an example of a BS 105, network entity 605, network entity 705, and/or network entity 800. Accordingly, the network entity 505 may include a BS. The BS may be an aggregated BS or a disaggregated BS, as described above. The UE 515 may correspond to and/or be an example of UE 115, UE 615, UE 715, and/or UE 900. In FIG. 5, the x-axis represents time in some arbitrary units.

In the scheme 500, the network entity 505 is configured to use a same set of TCI for DL/UL communications in either or both of single-target communications or multi-target communications. For example, the network entity 505 may transmit separate TCI activations associated with a same TCI, where the first activation indicates that the TCI can be applied to at least a single-target DL/UL communication, and a second activation indicates that the TCI can be applied to at least to a set of multi-target DL/UL communications. In some aspects, the set of TCIs configured by the network entity 505 comprises a single pool of unified TCIs, as described above.

The network entity 505 transmits, at time T0, a RRC communication or signal 502 that includes or indicates a TCI configuration 504. The TCI configuration 504 may indicate a plurality of TCI states, the corresponding reference signal resources, and the QCL type or types for each TCI state. The TCI states may be indexed with different TCI IDs, each having a value from 0-128, for example. Each TCI state indicates a beam direction that may be used for UL and/or DL communications. In some aspects, the TCI states included in the TCI configuration 504 may be associated with a unified TCI framework, as described above. In this regard, a unified TCI state may include, for instance, a joint DL/UL common TCI state indicating a common beam for at least one DL channel and at least one UL channel, a joint DL/UL common TCI state indicating a common beam for at least one DL reference signal and at least one UL reference signal, a separate DL common TCI state indicating a common beam for at least two DL channels, a separate DL common TCI state indicating a common beam for at least two DL reference signals, a separate UL common TCI state indicating a common beam for at least two UL channels, and/or a separate UL common TCI state indicating a common beam for at least two UL reference signals. The DL channels may include PDSCH, PDCCH, and/or PBCH. The UL channels may include PUCCH and/or PUSCH. The DL reference signals may include SSBs and/or CSI-RSs. The UL reference signals may include SRSs. In other aspects, the TCI configuration 504 may include non-unified TCI states.

At time T1, the network entity 505 transmits a first TCI activation 512 associated with a first TCI, which may also be referred to as a TCI state. The first TCI activation 512 may indicate that the first TCI may be applied at least to a single-target channel or reference signal (RS). Transmitting the first TCI activation 512 may include transmitting a DL communication signal (e.g., PDSCH communication) and/or a DL control signal (e.g., PDCCH carrying DCI). For example, in some aspects, the network entity 505 transmits a media access control-control element (MAC-CE) that includes or indicates the activation signal 512. A MAC-CE may include a MAC-CE header followed by MAC-CE information fields. In some instances, the MAC-CE header may indicate the type of MAC-CE information that is carried in the MAC-CE. In some aspects, the activation of the first TCI may be indicated based on the type of MAC-CE transmitted, or the type of MAC-CE header transmitted. In other aspects, the activation of the first TCI may be indicated based on a value of a field in the MAC-CE or the MAC-CE header. In other aspects, transmitting the first TCI activation 512 may include transmitting a DCI including or indicating the first TCI activation 512. In some aspects, transmitting the DCI to indicate the first TCI activation 512 may include transmitting a first type of DCI, where the first type of DCI (e.g., DCI format) is associated with the first activation 512, and a different second type of DCI is associated with a second activation (e.g., 522). In other aspects, the DCI may include a field or value that indicates the first TCI activation 512 and/or one or more other TCI activations.

At time T2, the network entity 505 transmits, and the UE 515 receives, a second TCI activation 522 associated with a second TCI. The first TCI activation 512 may indicate that the second TCI may be applied at least to a multi-target channel and/or RS. In one exemplary aspect, the first TCI and the second TCI are associated with a same TCI or TCI state. Further, although illustrated as being transmitted at different times T1 and T2, in some aspects, the network entity 505 may transmit the first activation signal 512 and the second activation signal 522 at a same time. In other words, in some aspects, T1 and T2 may correspond to a same time. Transmitting the second TCI activation 522 may include transmitting a MAC-CE and/or a DCI, as explained above. In that regard, one or more of a MAC-CE type, MAC-CE header, MAC-CE value, DCI type (e.g., DCI format), or a DCI field value may include or indicate the second TCI activation 522.

The first activation 512 may indicate that the TCI is associated with a single-target transmission, and the second activation 522 may indicate that the second TCI is associated with a multi-target transmission. Accordingly, the UE 515 may use the first TCI in receiving or transmitting a single communication or signal (e.g., a single DMRS, CSI-RS, PDSCH). In this regard, at time T3, the UE 515 communicates a first communication 506 based on the first TCI activation. In FIG. 5, the first communication 506 is a single-target communication associated with a single signal or channel (e.g., PDSCH). The first communication 506 may include a DL reception or a UL transmission. For example, the UE 515 may use the first TCI to receive a DL communication or DL signal, or to transmit a UL communication or UL signal.

In some aspects, for single-target communications associated with a single-target channel or RS, the TCI activation 512 may indicate that the TCI at least applies for a single-target communication. In some aspects, each TCI of the TCI configuration 504 may be configured in the RRC configuration for a corresponding target channel or RS. In this regard, in some aspects, a separate TCI activation for the first TCI (e.g., first TCI activation 512) may not be transmitted, as the TCI is already configured and activated for single-target communications based on the RRC configuration. For example, each TCI may be specifically configured in an RRC configuration for individual periodic or semi-persistent PUCCH communications, a CSI-RS resource, a SRS resource, aperiodic CSI-RS resource associated with a trigger state, aperiodic SRS resource, a PUSCH resource, a PDSCH resource, or any other suitable resource.

In another aspect, for single-target communications, the network entity 505 may dynamically activate or update a TCI using a MAC-CE, as explained above. For example, the network entity 505 may transmit a first MAC-CE having a first type indicating a TCI for single-target communications and/or a second MAC-CE having a second type indicating a TCI for multi-target communications. In other aspects, the MAC-CE may have a value or field indicating the selected TCI, and that the TCI is associated with a given CORESET resource, a PUCCH resource, a semi-persistent CSI-RS resource, an SRS resource, a CSI-RS resource associated with a trigger state, or any other suitable resource. In some aspects, the network entity 505 may transmit a MAC-CE having a first type, where the first type of MAC-CE indicates or activates a group of candidate TCI states for single-target communications.

In another aspect, for single-target communications, the network entity 505 may dynamically select a TCI using a DCI. For example, the network entity 505 may transmit a first DCI having a first type indicating a TCI for single-target communications and/or a second DCI having a second type indicating a TCI for multi-target communications. In some aspects, the DCI may have a value or field indicating the selected TCI, and that the TCI is associated with a given PDSCH resource, a PUSCH resource, a PUCCH resource, an aperiodic CSI-RS resource, a SRS resource, or any other suitable resource.

The UE 515 may determine a linkage between the second TCI and the corresponding multiple target channels and/or RSs based on an RRC configuration transmitted by the network entity 505, in some aspects. In other aspects, the UE 515 may determine a linkage between the second TCI and the corresponding multiple target channels and/or RSs dynamically based on the MAC-CE and/or DCI indicating the TCI activation 512. For example, a TCI state IE, a RRC IE, or the MAC-CE type may indicate the linkage between a TCI ID and a set of target channels and/or RSs to the corresponding set ID. In some aspects, the TCI configuration 504 may include a plurality of TCI codepoints. The UE 515 may be configured to map each TCI codepoint to at least one activated multi-target TCI state. In some aspects, the UE 515 determines or selects, for a corresponding set of multi-target channels and/or RSs, a TCI codepoint to be applied based on a type of DCI for multi-target TCI state selection.

At time T4, the UE 515 communicates a set of second communications 508, which includes two or more different DL and/or UL communications, based on the second TCI activation 522. The second UL communications are multi-target communications, such that the second TCI associated with the second TCI activation 522 is used for both of the communications of the second UL/DL communications. In some aspects, the second TCI associated with the second TCI activation 522 may be a common joint and/or separate TCI. Accordingly, in some aspects, the second TCI may be a common joint TCI associated with at least two of: a DL communication/channel or a DL signal; and a UL communication, or a UL signal. For example, if the second TCI is a common joint TCI, the UE 515 may use the second TCI to transmit at least one UL communication or signal, and to receive at least one DL communication or signal. If the second TCI is a common separate TCI, the UE 515 may use the second TCI to transmit at least two UL communications and/or UL signals, or to receive at least two DL communications and/or DL signals.

FIG. 6 illustrates a beam indication communication scheme 600 according to one or more aspects of the present disclosure. In the scheme 600, a network entity 605 and a UE 615 may operate in a channel over the frequency band, as discussed in relation to FIG. 4. Although one network entity 605 and one UE 615 are shown, it should be understood that the scheme 600 may be employed by one or more network entities 605 and one or more UEs 615 in a network such as the network 100. The network entity 605 may correspond to and/or be an example of BS 105, network entity 505, network entity 705, and/or network entity 800. Accordingly, the network entity 605 may include a BS. The BS may be an aggregated BS or a disaggregated BS, as described above. The UE 615 may correspond to and/or be an example of UE 115, UE 515, UE 715, and/or UE 900.

In FIG. 6, the x-axis represents time in some arbitrary units. In the scheme 600, the UE 615 and/or the network entity 605 may be configured to use a same TCI for both single-target and multi-target beam indications, but only at different times, and not simultaneously. Accordingly, in the scheme 600, the network entity 605 may transmit a first activation indicating a TCI for a single-target beam indication, and following a UE communication using the single-target beam indication, the network entity 605 may transmit a second activation indicating the same TCI for multi-target beam indication.

The network entity 605 transmits, at time T0, a RRC communication or signal 602 that includes or indicates a TCI configuration 604. The TCI configuration may indicate a plurality of TCI states, the corresponding reference signal resources, and the QCL type or types for each TCI state. The TCI states may be indexed and associated with a value from 0-128, for example. Each TCI state indicates a beam direction that may be used for UL and/or DL communications. In some aspects, the TCI states included in the TCI configuration 604 may be associated with a unified TCI framework, as described above.

At time T1, the network entity 605 transmits a first TCI activation 612 associated with a first TCI, which may also be referred to as a TCI state. Transmitting the first TCI activation 612 may include transmitting a DL communication signal (e.g., PDSCH communication) and/or a DL control signal (e.g., PDCCH carrying DCI). For example, in some aspects, the network entity 605 transmits a media access control-control element (MAC-CE) that includes or indicates the activation signal 622. A MAC-CE may include a MAC-CE header followed by MAC-CE information fields. In some aspects, the activation of the first TCI may be indicated based on the type of MAC-CE transmitted, or the type of MAC-CE header transmitted. In other aspects, the activation of the first TCI may be indicated based on a value of a field in the MAC-CE or the MAC-CE header. In other aspects, transmitting the first TCI activation 622 may include transmitting a DCI including or indicating the first TCI activation 612. In some aspects, transmitting the DCI to indicate the first TCI activation 612 may include transmitting a first type of DCI, where the first type of DCI (e.g., DCI format) is associated with the first activation 612, and a different second type of DCI is associated with a second activation (e.g., 622). In other aspects, the DCI may include a field or value that indicates the first TCI activation 612 and/or one or more other TCI activations.

The first activation 612 may indicate that the TCI is associated with a single-target transmission. Accordingly, the UE 615 may use the first TCI in receiving or transmitting a single communication or signal (e.g., a single DMRS, CSI-RS, PDSCH). In this regard, at time T2, the UE 615 transmits a first communication 606 based on the first TCI activation 612. In FIG. 6, the first communication 606 is a single-target communication associated with a single signal or channel (e.g., PDSCH). The first communication 606 may include a UL communication or a DL communication.

At time T3, the network entity 605 transmits, and the UE 615 receives, a second TCI activation 622 associated with a second TCI. Transmitting the second TCI activation 622 may include transmitting a MAC-CE and/or a DCI, as explained above. In that regard, one or more of a MAC-CE type, MAC-CE header, MAC-CE value, DCI type (e.g., DCI format), or a DCI field value may include or indicate the second TCI activation 622.

At time T4, the UE 615 communicates a set of second communications 608, which includes two or more different communications, based on the second TCI activation 622. The second communications 608 are multi-target communications, such that the second TCI associated with the second TCI activation 622 is used for both of the communications of the second communications 608. In some aspects, the second TCI associated with the second TCI activation 622 may be a common joint and/or separate TCI. Accordingly, in some aspects, the second TCI may be associated with at least two of a DL communication/channel, a DL signal, a UL communication/channel, and/or a UL signal. For example, if the second TCI is a common joint TCI, the UE 615 may use the second TCI to transmit at least one UL communication or signal, and to receive at least one DL communication or signal. If the second TCI is a common separate TCI, the UE 615 may use the second TCI to transmit at least two UL communications and/or UL signals, or to receive at least two DL communications and/or DL signals.

In the scheme 600, the first and second TCI may correspond to a same TCI or TCI state. Accordingly, the UE 615 may be configured to use the same TCI for single-target communications and multi-target communications, but where the single-target indication and the multi-target indication for the TCI are indicated at different times. Thus, in the scheme 600, a same (e.g., unified) state may be used for single-target communications and multi-target communications, but not simultaneously. In this regard, the network entity 605 may transmit different TCI activations associated with different TCIs for single-target communications and multi-target communications. For example, the network entity 605 may transmit, and the UE 615 may receive, the first TCI activation 612 indicating a first TCI for a single-target communication, and the second TCI activation 622 indicating a second TCI for a multi-target communication. In some aspects, the network entity 605 may transmit a first TCI configuration for single-target communications, and a second TCI configuration for multi-target communications. For example, the BS may select first TCI from the first TCI configuration for the single-target communications, and a second TCI from the second TCI configuration for the multi-target communications. In other words, the network entity 605 may switch between single-target communications and multi-target communications, and vice versa, by transmitting a corresponding TCI configuration.

FIG. 7 illustrates a beam indication communication scheme 700 according to one or more aspects of the present disclosure. In the scheme 700, a network entity 705 and a UE 715 may operate in a channel over the frequency band, as discussed in relation to FIG. 4. Although one network entity 705 and one UE 715 are shown, it should be understood that the scheme 700 may be employed by one or more network entities 705 and one or more UEs 715 in a network such as the network 100. The network entity 705 may correspond to and/or be an example of BS 105, network entity 505, network entity 605, and/or network entity 800. Accordingly, the network entity 705 may include a BS. The BS may be an aggregated BS or a disaggregated BS, as described above. The UE 715 may correspond to and/or be an example of UE 115, UE 515, UE 615, and/or UE 900. In FIG. 7, the x-axis represents time in some arbitrary units.

In the scheme 700, the UE 715 and/or the network entity 705 are configured to use different sets of groups of TCI states for single-target and multi-target beam indications. Accordingly, in the scheme 700, the network entity 705 may transmit, for a single-target beam indication, a first activation indicating a first TCI associated with a first TCI set or pool. Following the UE communication using the single-target beam indication, the network entity 705 may transmit, for a multi-target beam indication, a second activation indicating a second TCI different from the first TCI, where the second TCI is associated with a second set or pool of TCIs.

The network entity 705 transmits, at time TO, a RRC communication or signal 702 that includes or indicates a first TCI configuration 704a and a second TCI configuration 704b. Each of the TCI configurations 704a, 704b may indicate a plurality of TCI states, the corresponding reference signal resources, and the QCL type or types for each TCI state. The TCI states may be indexed and associated with a value from 0-128, for example. Each TCI state indicates a beam direction that may be used for UL and/or DL communications. In some aspects, the first TCI configuration 704a may include a first set of TCI types or IDs, and the second TCI configuration 704b may include a second set of TCI types or IDs different from the first set of TCI types or TCI IDs. In some aspects, the first TCI configuration 704a may include a first TCI state pool, and the second TCI configuration 704b may include a second TCI state pool different from the first TCI state pool. In some aspects, the second TCI state pool of the second TCI configuration 704b may be associated with a unified TCI framework, as described above, while the first TCI pool of the first TCI configuration 704a is not associated with the unified TCI framework. Although shown as being transmitted in the same RRC communication or signal 702, it will be understood that the TCI state configurations 704a, 704b may be transmitted at different times and/or in different RRC communication signals.

At time T1, the network entity 705 transmits a first TCI activation 712 associated with a first TCI associated with the first TCI configuration 704a. Transmitting the first TCI activation 712 may include transmitting a DL communication signal (e.g., PDSCH communication) and/or a DL control signal (e.g., PDCCH carrying DCI). For example, in some aspects, the network entity 705 transmits a media access control-control element (MAC-CE) that includes or indicates the activation signal 712. The MAC-CE may include or be appended to a MAC-CE header. In some aspects, the activation of the first TCI may be indicated based on the type of MAC-CE transmitted, or the type of MAC-CE header transmitted. In other aspects, the activation of the first TCI may be indicated based on a value of a field in the MAC-CE or the MAC-CE header. In other aspects, transmitting the first TCI activation 712 may include transmitting a DCI including or indicating the first TCI activation 712. In some aspects, transmitting the DCI to indicate the first TCI activation 712 may include transmitting a first type of DCI, where the first type of DCI (e.g., DCI format) is associated with the first activation 712, and a different second type of DCI is associated with a second activation (e.g., 722). In other aspects, the DCI may include a field or value that indicates the first TCI activation 712 and/or one or more other TCI activations.

The first activation 712 may indicate that the TCI is associated with a single-target transmission. Accordingly, the UE 715 may use the first TCI in receiving or transmitting a single communication or signal (e.g., a single DMRS, CSI-RS, PDSCH). In this regard, at time T2, the UE 715 transmits or receives a first communication 706 based on the first TCI activation 712. In FIG. 7, the first communication 706 is a single-target communication associated with a single signal or channel (e.g., PDSCH). As above, the first communication 706 may be a UL communication or a DL communication. Accordingly, the UE 715 may receive the first communication 706 based on the first TCI, or transmit the communication 706 based on the first TCI.

At time T3, the network entity 705 transmits, and the UE 715 receives, a second TCI activation 722 associated with a second TCI, where the second TCI is associated with or selected from the second TCI configuration 704b. Transmitting the second TCI activation 722 may include transmitting a MAC-CE and/or a DCI, as explained above. In that regard, one or more of a MAC-CE type, MAC-CE header, MAC-CE value, DCI type (e.g., DCI format), or a DCI field value may include or indicate the second TCI activation 722.

At time T4, the UE 715 communications a second set of communications 708, which includes two or more different UL and/or DL communications, based on the second TCI activation 722. The second communications 708 are multi-target communications, such that the second TCI associated with the second TCI activation 722 is used for both of the communications of the second set of communications 708. In some aspects, the second TCI associated with the second TCI activation 722 may be a common joint and/or separate TCI. Accordingly, in some aspects, the second TCI may be associated with at least two of a DL communication/channel, a DL signal, a UL communication/channel, and/or a UL signal. For example, if the second TCI is a common joint TCI, the UE 715 may use the second TCI to transmit at least one UL communication or signal, and to receive at least one DL communication or signal. If the second TCI is a common separate TCI, the UE 715 may use the second TCI to transmit at least two UL communications and/or UL signals, or to receive at least two DL communications and/or DL signals.

In the scheme 700, the first and second TCI are different, and may be associated with different TCI state characteristics or pools. For example, the second TCI may be selected from a second TCI pool associated with a unified TCI framework, while the first TCI is selected from a first TCI pool associated with a different TCI framework. For example, the unified TCI framework (e.g., second TCI configuration 704b) may be configured for use by UEs and/or BSs configured with the Release 17 of the 3GPP standard, and the non-unified TCI framework (e.g., first TCI configuration 704a) may be configured for use by UEs and/or BSs configured with the Release 15 and/or Release 16 of the 3GPP standard.

Figure 8:
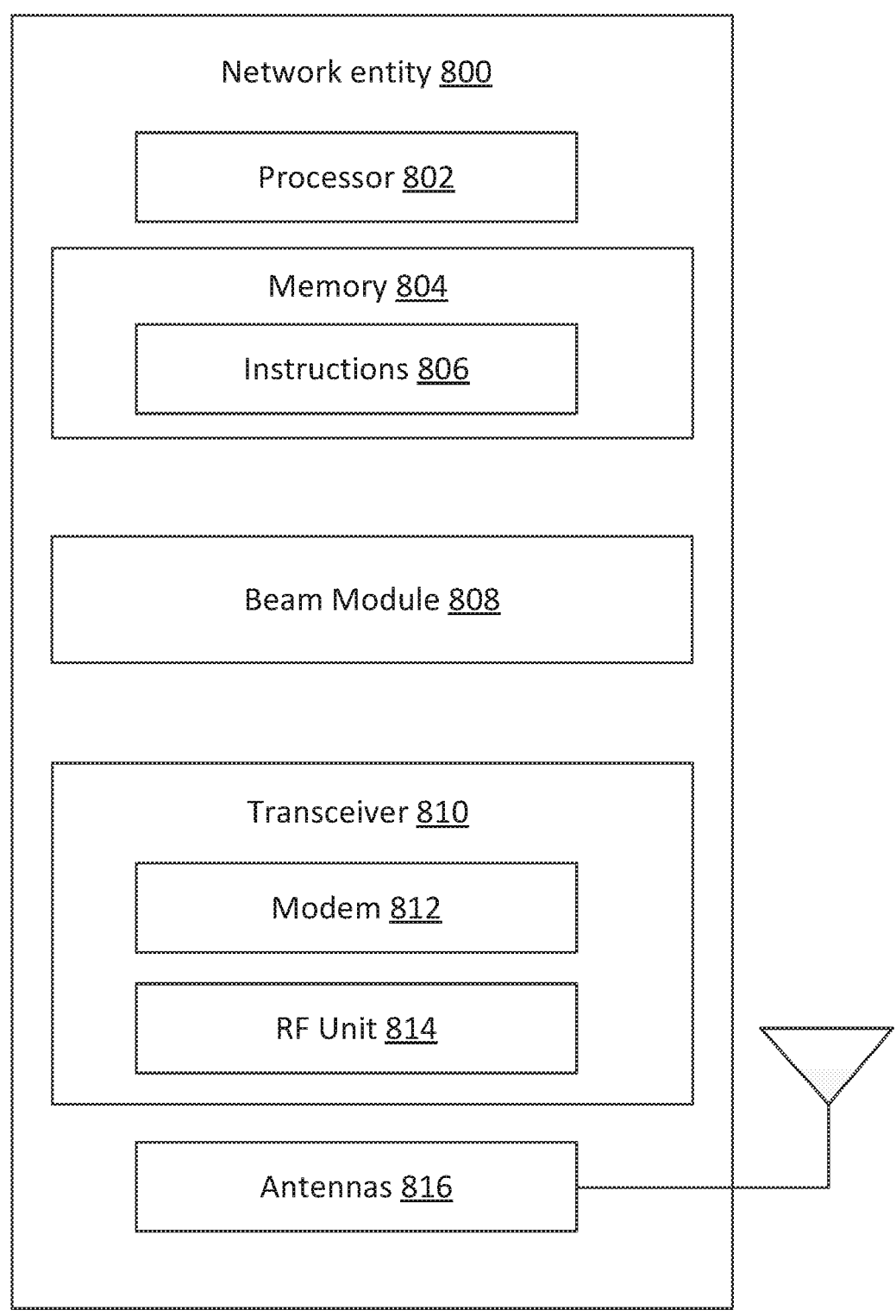
FIG. 8 is a block diagram of a network entity according to one or more aspects of the present disclosure.

FIG. 8 is a block diagram of a network entity 800 according to one or more aspects of the present disclosure. The network entity 800 may be a BS 105, network entity 505, network entity 605, and/or the network entity 705 as discussed in FIGS. 5-7. Accordingly, the network entity 800 may include a BS. The BS may be an aggregated BS or a disaggregated BS, as described above. As shown, the network entity 800 may include a processor 802, a memory 804, a beam module 808, a transceiver 810 including a modem subsystem 812 and a radio frequency (RF) unit 814, and one or more antennas 816. These elements may be coupled with one another. The term "coupled" may refer to directly or indirectly coupled or connected to one or more intervening elements. For instance, these elements may be in direct or indirect communication with each other, for instance via one or more buses.

The processor 802 may have various features as a specific-type processor. For instance, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for instance, aspects of FIGS. 5-7. Instructions 806 may also be referred to as program code. The program code may be for causing a wireless communication device to perform these operations, for instance by causing one or more processors (such as processor 802) to control or command the wireless communication device to do so. The terms "instructions" and "code" should be interpreted broadly to include any type of computer-readable statement(s). For instance, the terms "instructions" and "code" may refer to one or more programs, routines, sub-routines, functions, procedures, etc. "Instructions" and "code" may include a single computer-readable statement or many computer-readable statements.

The beam module 808 may be implemented via hardware, software, or combinations thereof. For instance, the beam module 808 may be implemented as a processor, circuit, and/or instructions 806 stored in the memory 804 and executed by the processor 802. In some instances, the beam module 808 can be integrated within the modem subsystem 812. For instance, the beam module 808 can be implemented by a combination of software components (e.g., executed by a DSP or a general processor) and hardware components (e.g., logic gates and circuitry) within the modem subsystem 812. The beam module 808 may communicate with one or more components of the network entity 800 to implement various aspects of the present disclosure, for instance, aspects of FIGS. 5-7.

In some aspects, the beam module 808 may be configured to transmit, to a UE: a configuration for a plurality of transmission configuration indications (TCIs), a first activation of a first TCI of the plurality of TCIs for a first signal, and a second activation of a second TCI of the plurality of TCIs for a plurality of second signals. The beam module 808 may be further configured to communicate, based on the first TCI, the first signal, and communicate, based on the second TCI, at least one of the plurality of second signals. In some aspects, communicating the first signal and second signal may include transmitting one or more DL communications and/or DL reference signals based on the first TCI, or receiving one or more UL communications and/or UL reference signals based on the first TCI. Further, in some aspects, communicating the second signal may include transmitting one or more DL communications and/or DL reference signals based on the second TCI, and/or receiving one or more UL communications and/or UL reference signals based on the second TCI.

In some aspects, the first signal may be associated with a single-target communication, and the at least one of the plurality of second signals may be associated with a multi-target communication. In some aspects, the plurality of second signals be by associated with a UL/DL common TCI configuration. For example, in some aspects, the second TCI includes a joint uplink/downlink (UL/DL) common TCI state indicating a beam pair for: at least one of a DL channel signal or a DL reference signal; and at least one of a UL channel signal or a UL reference signal. In some aspects, the second TCI includes a DL common TCI state indicating a common beam for at least two of a first DL channel signal, a second DL channel signal, a first DL reference signal, or a second DL reference signal. In some aspects, the second TCI includes a DL common TCI state indicating a common beam for at least two of a first UL channel signal, a second UL channel signal, a first UL reference signal, or a second UL reference signal.

In some aspects, the beam module 808 is configured to transmit a first radio resource configuration (RRC) configuration indicating the first activation of the first TCI associated with the first signal. In some aspects, the beam module 808 is configured to transmit a second RRC configuration including the second activation of the second TCI associated with the plurality of second signals. In some aspects, the beam module 808 is configured to transmit a first media access control-control element (MAC-CE) indicating the first activation of the first TCI associated with the first signal. In some aspects, the beam module 808 is configured to transmit a second MAC-CE including the second activation of the second TCI associated with the plurality of second signals. In some aspects, the beam module 808 is configured to transmit a first downlink control information (DCI) indicating the first activation of the first TCI associated with the first signal. In some aspects, the beam module 808 is configured to transmit a second DCI including the second activation of the second TCI associated with the plurality of second signals. In some aspects, the beam module 808 may be configured to indicate the first activation and/or the second activation based on a type of the MAC-CE and/or the DCI. In other aspects, the beam module 808 may be configured to indicate the first activation and/or the second activation based on a field or value of the MAC-CE and/or the DCI.

In some aspects, the first TCI associated with the first signal and the second TCI associated with the plurality of second signals correspond to a same common TCI or a same spatial filter for directional beamforming. In some aspects, the configuration for the plurality of TCIs further indicates that the common TCI is associated with a single-target beam indication and a multiple-target beam indication at the same time. In a further aspect, the beam module 808 is configured to transmit an indication indicating that the common TCI is associated with a single-target beam indication and a multiple target beam indication at the same time. In another aspect, the beam module 808 is configured to transmit an indication indicating that the common TCI is associated with a single-target beam indication or a multiple-target beam indication.

In some aspects, the configuration for the plurality of TCIs further indicates: a first TCI pool associated with the single-target beam indication and including the first subset of the plurality of TCIs, and a second TCI pool associated with a multi-target beam indication and including the second subset of the plurality of TCIs. In another aspect, the configuration for the plurality of TCIs further indicates a first plurality of TCI state identifiers (IDs) associated with the single-target beam indication, where each of the first plurality of TCI state ID identifies one TCI of the first subset of the plurality of TCIs. In another aspect, the configuration for the plurality of TCIs further indicates a second plurality of TCI state IDs associated with the multiple-target beam indication, where each of the second plurality of TCI state IDs identifies one TCI of the second subset of the plurality of TCIs.

In some aspects, the first TCI associated with the first signal is different than the second TCI associated with the plurality of second signals. In another aspect, a first subset of the plurality of TCIs are associated with a single-target beam indication. In another aspect, a second subset of the plurality of TCIs are associated with a multiple-target beam indication and non-overlapping with the second subset. In another aspect, the first TCI activated for the first signal is within the first subset, and the second TCI activated for the plurality of second signals is within the second subset.

As shown, the transceiver 810 may include the modem subsystem 812 and the RF unit 814. The transceiver 810 can be configured to communicate bi-directionally with other devices, such as the UE 115, UE 515, UE 615, UE 715, UE 900 and/or another core network element. The modem subsystem 812 may be configured to modulate and/or encode data according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (DCI, TCI state, an indication of a beam direction associated with a beam application time, communication signals, data signals, etc.) from the modem subsystem 812 (on outbound transmissions). The RF unit 814 may be further configured to perform analog beamforming in conjunction with the digital beamforming. Although shown as integrated together in transceiver 810, the modem subsystem 812 and/or the RF unit 814 may be separate devices that are coupled together at the network entity 800 to enable the network entity 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The transceiver 810 may provide the demodulated and decoded data (e.g., communication signals, data signals, etc.) to the beam module 808 for processing. The antennas 816 may include multiple antennas of similar or different designs in order to sustain multiple transmission links.

In some aspects, the transceiver 810 is configured to transmit, to a UE, an indication of a first beam direction associated with a beam application time. The transceiver 810 is further configured to receive an UL communication including one or more repetitions of a UL communication signal. The transceiver 810 is configured to receive the UL communication by, for instance, receiving, based on a second beam direction different from the first beam direction before the beam application time, at least a first repetition of the one or more repetitions of the UL communication signal and receiving, based on the first beam direction and on the beam application time, at least a second repetition of the one or more repetitions of the UL communication signal.

In some aspects, the transceiver 810 is configured to transmit, to a UE, an indication of a first beam direction associated with a beam application time. The transceiver 810 is further configured to receive, based on a second beam direction different from the first beam direction, a first UL communication including one or more repetitions of a first UL communication signal, wherein at least a first repetition of the one or more repetitions is received before the beam application time and at least a second repetition of the one or more repetitions is received after the beam application time. The transceiver 810 is further configured to receive, based on the first beam direction, a second UL communication after receiving the first UL communication.

In some aspects, the transceiver 810 is configured to transmit, to a UE, an indication of a first beam direction associated with a beam application time. The transceiver 810 is further configured to receive, based on a second beam direction different from the first beam direction before the beam application time, a first UL communication including one or more repetitions of a first UL communication signal less than a number of repetitions associated with a UL grant for the first UL communication. The transceiver 810 is further configured to refrain from receiving at least a second repetition of the UL communication signal associated with the UL grant after the beam application time. The transceiver

810 is further configured to receive, based on the first beam direction and the beam application time, a second UL communication.

Figure 9:
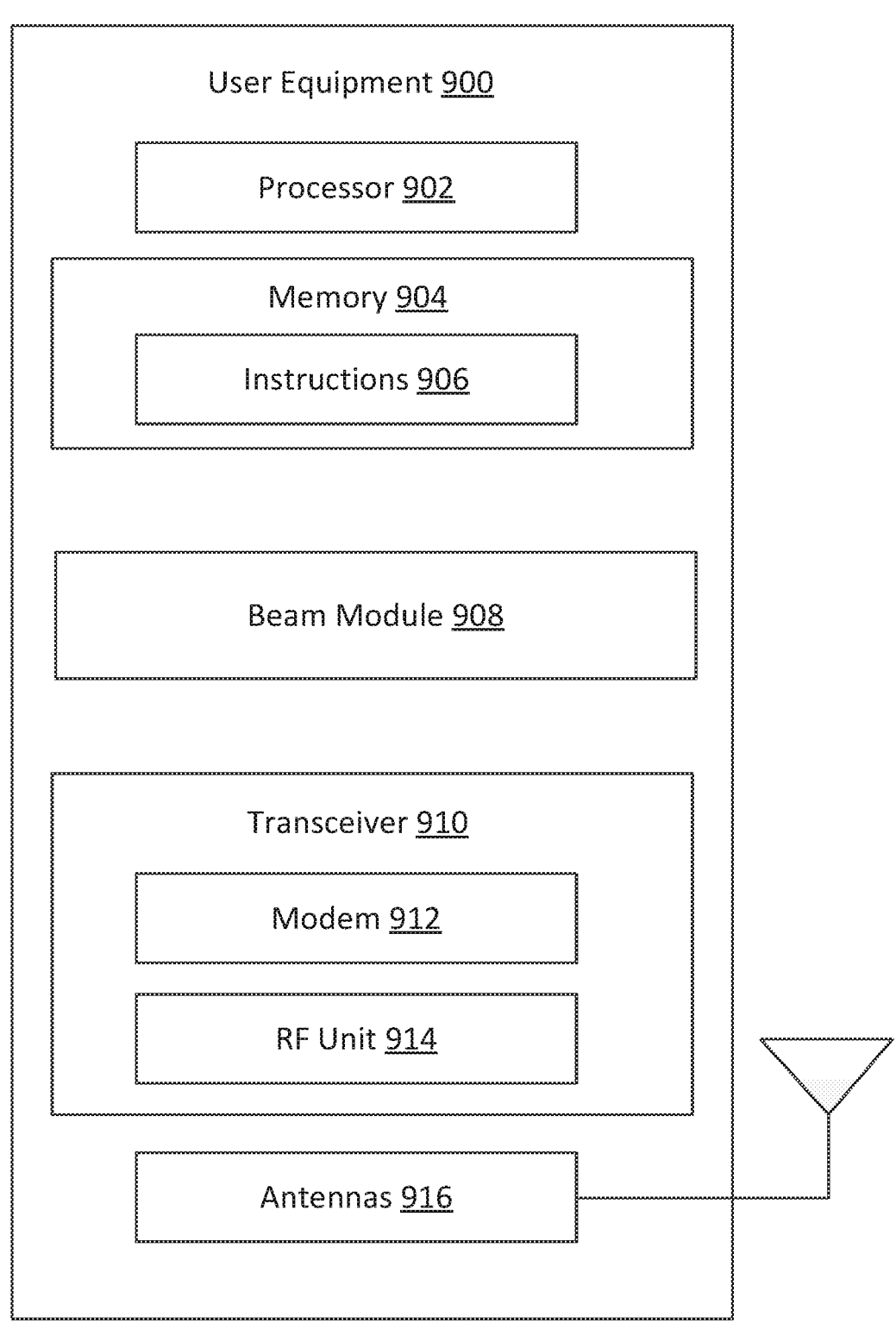
FIG. 9 is a block diagram of a user equipment (UE) according to one or more aspects of the present disclosure.

FIG. 9 is a block diagram of a UE 900 according to one or more aspects of the present disclosure. The UE 900 may be, for instance, a UE 115, UE 415, UE 515, UE 615 as discussed in FIGS. 5-7. As shown, the UE 900 may include a processor 902, a memory 904, a beam module 908, a transceiver 910 including a modem subsystem 912 and an RF unit 914, and one or more antennas 916. These elements may be coupled with one another. The term "coupled" may refer to directly or indirectly coupled or connected to one or more intervening elements. For instance, these elements may be in direct or indirect communication with each other, for instance via one or more buses.

The processor 902 may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to a UE 115 or an anchor in connection with aspects of the present disclosure, for instance, aspects of FIGS. 5-7. Instructions 906 may also be referred to as code, which may be interpreted broadly to include any type of computer-readable statement(s) as discussed above with respect to FIGS. 5-7.

The beam module 908 may be implemented via hardware, software, or combinations thereof. For instance, the beam module 908 may be implemented as a processor, circuit, and/or instructions 906 stored in the memory 904 and executed by the processor 902. In some aspects, the beam module 908 can be integrated within the modem subsystem 912. For instance, the beam module 908 can be implemented by a combination of software components (e.g., executed by a DSP or a general processor) and hardware components (e.g., logic gates and circuitry) within the modem subsystem 912. The beam module 908 may communicate with one or more components of the UE 900 to implement various aspects of the present disclosure, for instance, aspects of FIGS. 5-7.

In some aspects, the beam module 908 may be configured to receive, from a BS: a configuration for a plurality of transmission configuration indications (TCIs), a first activation of a first TCI of the plurality of TCIs for a first signal, and a second activation of a second TCI of the plurality of TCIs for a plurality of second signals. The beam module 908 may be further configured to communicate, based on the first TCI, the first signal, and communicate, based on the second TCI, at least one of the plurality of second signals. In some aspects, communicating the first signal and second signal may include receiving one or more DL communications and/or DL reference signals based on the first TCI, or transmitting one or more UL communications and/or UL reference signals based on the first TCI. Further, in some aspects, communicating the second signal may include receiving one or more DL communications and/or DL reference signals based on the second TCI, and/or transmitting one or more UL communications and/or UL reference signals based on the second TCI.

In some aspects, the first signal may be associated with a single-target communication, and the at least one of the plurality of second signals may be associated with a multi-target communication. In some aspects, the plurality of second signals be by associated with a UL/DL common TCI configuration. For example, in some aspects, the second TCI includes a joint uplink/downlink (UL/DL) common TCI state indicating a beam pair for: at least one of a DL channel signal or a DL reference signal; and at least one of a UL channel signal or a UL reference signal. In some aspects, the second TCI includes a DL common TCI state indicating a common beam for at least two of a first DL channel signal, a second DL channel signal, a first DL reference signal, or a second DL reference signal. In some aspects, the second TCI includes a DL common TCI state indicating a common beam for at least two of a first UL channel signal, a second UL channel signal, a first UL reference signal, or a second UL reference signal.

In some aspects, the beam module 908 is configured to receive a first radio resource configuration (RRC) configuration indicating the first activation of the first TCI associated with the first signal. In some aspects, the beam module 908 is configured to communicate a second RRC configuration including the second activation of the second TCI associated with the plurality of second signals. In some aspects, the beam module 908 is configured to receive a first media access control-control element (MAC-CE) indicating the first activation of the first TCI associated with the first signal. In some aspects, the beam module 908 is configured to receive a second MAC-CE including the second activation of the second TCI associated with the plurality of second signals. In some aspects, the beam module 908 is configured to receive a first downlink control information (DCI) indicating the first activation of the first TCI associated with the first signal. In some aspects, the beam module 908 is configured to receive a second DCI including the second activation of the second TCI associated with the plurality of second signals. In some aspects, the beam module 908 may be configured to determine or receive the first activation and/or the second activation based on a type of the MAC-CE and/or the DCI. In other aspects, the beam module 908 may be configured to determine or receive the first activation and/or the second activation based on a field or value of the MAC-CE and/or the DCI.

In some aspects, the first TCI associated with the first signal and the second TCI associated with the plurality of second signals correspond to a same common TCI or a same spatial filter for directional beamforming. In some aspects, the configuration for the plurality of TCIs further indicates that the common TCI is associated with a single-target beam indication and a multiple-target beam indication at the same time. In a further aspect, the beam module 908 is configured to receive an indication indicating that the common TCI is associated with a single-target beam indication and a multiple target beam indication at the same time. In another aspect, the beam module 908 is configured to receive an indication indicating that the common TCI is associated with a single-target beam indication or a multiple-target beam indication.

In some aspects, the configuration for the plurality of TCIs further indicates: a first TCI pool associated with the single-target beam indication and including the first subset of the plurality of TCIs, and a second TCI pool associated with a multi-target beam indication and including the second subset of the plurality of TCIs. In another aspect, the configuration for the plurality of TCIs further indicates a first plurality of TCI state identifiers (IDs) associated with the single-target beam indication, where each of the first plurality of TCI state ID identifies one TCI of the first subset of the plurality of TCIs. In another aspect, the configuration for the plurality of TCIs further indicates a second plurality of TCI state IDs associated with the multiple-target beam indication, where each of the second plurality of TCI state IDs identifies one TCI of the second subset of the plurality of TCIs.

In some aspects, the first TCI associated with the first signal is different than the second TCI associated with the plurality of second signals. In another aspect, a first subset of the plurality of TCIs are associated with a single-target beam indication. In another aspect, a second subset of the plurality of TCIs are associated with a multiple-target beam indication and non-overlapping with the second subset. In another aspect, the first TCI activated for the first signal is within the first subset, and the second TCI activated for the plurality of second signals is within the second subset.

As shown, the transceiver 910 may include the modem subsystem 912 and the RF unit 914. The transceiver 910 can be configured to communicate bi-directionally with other devices, such as the BSs 105 and/or network entities 705. The modem subsystem 912 may be configured to modulate and/or encode the data from the memory 904 and/or the beam module 908 according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., communication signals, data signals, etc., etc.) from the modem subsystem 912 (on outbound transmissions). The RF unit 914 may be further configured to perform analog beamforming in conjunction with the digital beamforming. Although shown as integrated together in transceiver 910, the modem subsystem 912 and the RF unit 914 may be separate devices that are coupled together at the UE 900 to enable the UE 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., DCI, TCI, TCI configuration, a TCI activation, an indication of a beam direction associated with a beam application time, communication signals, data signals, etc.) to the beam module 908 for processing. The antennas 916 may include multiple antennas of similar or different designs in order to sustain multiple transmission links.

In some aspects, the transceiver 910 may be configured to receive, from a BS, an indication of a first beam direction associated with a beam application time. The transceiver 910 may be further configured to communicate a first communication including one or more repetitions of a communication signal. The transceiver 910 may be configured to communicate the first communication by communicating, based on a second beam direction different from the first beam direction before the beam application time, at least a first repetition of the one or more repetitions of the communication signal and communicating, based on the first beam direction and the beam application time, at least a second repetition of the one or more repetitions of the communication signal.

In some aspects, the transceiver 910 may be configured to receive, from a BS, an indication of a first beam direction associated with a beam application time. The transceiver 910 may be further configured to communicate, based on a second beam direction different from the first beam direction, a first communication including one or more repetitions of a first communication signal, where at least a first repetition of the one or more repetitions is communicated before the beam application time and at least a second repetition of the one or more repetitions is communicated after the beam application time. The transceiver 910 may be further configured to communicate, based on the first beam direction, a second communication after communicating the first communication.

In some aspects, the transceiver 910 may be configured to receive, from a BS, an indication of a first beam direction associated with a beam application time. The transceiver 910 may be further configured to communicate, based on a second beam direction different from the first beam direction before the beam application time, a first communication including one or more repetitions of a first communication signal less than a number of repetitions associated with a grant for the first communication. The transceiver 910 may be further configured to refrain from communicating at least a second repetition of the one or more repetitions of the first communication signal. The transceiver 910 may be further configured to communicate, based on the first beam direction and on the beam application time, a second communication after communicating the first communication.

FIG. 10 is a flow diagram illustrating a beam indication communication method 1000 according to one or more aspects of the present disclosure. Aspects of the method 1000 can be executed by a computing device (e.g., a processor, processing circuit, and/or other suitable component) of a wireless communication device or other suitable means for performing the blocks. For instance, the wireless communication device may be a network entity 800. The network entity 800 may utilize one or more components, such as the processor 802, the memory 804, the beam module 808, the transceiver 810, the modem 812, the RF unit 814, and/or the one or more antennas 816, to execute the blocks of method 1000. The method 1000 may employ similar mechanisms as described in FIGS. 5-7. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1002, the BS transmits, to a UE a configuration for a plurality of transmission configuration indications (TCIs). In some aspects, transmitting the configuration for the plurality of TCIs may include transmitting an RRC configuration including one or more sets of pools of TCIs. The RRC configuration may indicate, for each TCI state, the corresponding communication signals and/or reference signals, and the corresponding QCL states. The network entity 800 may utilize one or more components, such as the processor 802, the memory 804, the beam module 808, the transceiver 810, the modem 812, the RF unit 814, and/or the one or more antennas 816, to execute the actions of block 1002.

At block 1004, the BS transmits, to the UE, a first activation of a first TCI of the plurality of TCIs for a first signal. In some aspects, transmitting the first activation includes transmitting a first media access control-control element (MAC-CE) indicating the first activation of the first TCI associated with the first signal. In some aspects, transmitting the first activation includes transmitting a first downlink control information (DCI) indicating the first activation of the first TCI associated with the first signal. In some aspects, transmitting the first activation includes indicating the first activation based on a type of the MAC-CE and/or the DCI. In other aspects, transmitting the first activation may include indicating the first activation based on a field or value of the MAC-CE and/or the DCI. The network entity 800 may utilize one or more components, such as the processor 802, the memory 804, the beam module 808, the transceiver 810, the modem 812, the RF unit 814, and/or the one or more antennas 816, to execute the actions of block 1004.

At block 1006, the BS transmits, to the UE, a second activation of a second TCI of the plurality of TCIs for a plurality of second signals. In some aspects, transmitting the first activation includes transmitting a second MAC-CE indicating the second activation of the second TCI associated with the second signal. In some aspects, transmitting the second activation includes transmitting a second DCI indicating the second activation of the second TCI associated with the second signal. In some aspects, transmitting the second activation includes indicating the second activation based on a type of the MAC-CE and/or the DCI. In other aspects, transmitting the second activation may include indicating the second activation based on a field or value of the MAC-CE and/or the DCI. The network entity 800 may utilize one or more components, such as the processor 802, the memory 804, the beam module 808, the transceiver 810, the modem 812, the RF unit 814, and/or the one or more antennas 816, to execute the actions of block 1006.

At block 1008, the BS communicates, based on the first TCI, the first signal. In some aspects, communicating the first signal may include transmitting one or more DL communications and/or DL reference signals based on the first TCI, or receiving one or more UL communications and/or UL reference signals based on the first TCI. For example, communicating the first signal may include transmitting a DL communication signal (e.g., PDSCH communication) and/or a DL reference signal (e.g., CSI-RS, SRS, etc.). The network entity 800 may utilize one or more components, such as the processor 802, the memory 804, the beam module 808, the transceiver 810, the modem 812, the RF unit 814, and/or the one or more antennas 816, to execute the actions of block 1008.

At block 1010, the BS communicates, based on the second TCI, at least one of the plurality of second signals. In some aspects, communicating the second signal may include transmitting one or more DL communications and/or DL reference signals based on the second TCI, and/or receiving one or more UL communications and/or UL reference signals based on the second TCI. The network entity 800 may utilize one or more components, such as the processor 802, the memory 804, the beam module 808, the transceiver 810, the modem 812, the RF unit 814, and/or the one or more antennas 816, to execute the actions of block 1008.

In some aspects, the first signal may be associated with a single-target communication, and the at least one of the plurality of second signals may be associated with a multi-target communication. In some aspects, the plurality of second signals be by associated with a UL/DL common TCI configuration. For example, in some aspects, the second TCI includes a joint uplink/downlink (UL/DL) common TCI state indicating a beam pair for: at least one of a DL channel signal or a DL reference signal; and at least one of a UL channel signal or a UL reference signal. In some aspects, the second TCI includes a DL common TCI state indicating a common beam for at least two of a first DL channel signal, a second DL channel signal, a first DL reference signal, or a second DL reference signal. In some aspects, the second TCI includes a DL common TCI state indicating a common beam for at least two of a first UL channel signal, a second UL channel signal, a first UL reference signal, or a second UL reference signal.

In some aspects, the first TCI associated with the first signal and the second TCI associated with the plurality of second signals correspond to a same common TCI or a same spatial filter for directional beamforming. In some aspects, the configuration for the plurality of TCIs further indicates that the common TCI is associated with a single-target beam indication and a multiple-target beam indication at the same time.

In a further aspect, the method 1000 further includes transmitting an indication indicating that the common TCI is associated with a single-target beam indication and a multiple target beam indication at the same time. In another aspect, the method 1000 includes transmitting an indication indicating that the common TCI is associated with a single-target beam indication or a multiple-target beam indication.

In some aspects, the configuration for the plurality of TCIs further indicates: a first TCI pool associated with the single-target beam indication and including the first subset of the plurality of TCIs, and a second TCI pool associated with a multi-target beam indication and including the second subset of the plurality of TCIs. In another aspect, the configuration for the plurality of TCIs further indicates a first plurality of TCI state identifiers (IDs) associated with the single-target beam indication, where each of the first plurality of TCI state ID identifies one TCI of the first subset of the plurality of TCIs. In another aspect, the configuration for the plurality of TCIs further indicates a second plurality of TCI state IDs associated with the multiple-target beam indication, where each of the second plurality of TCI state IDs identifies one TCI of the second subset of the plurality of TCIs.

In some aspects, the first TCI associated with the first signal is different than the second TCI associated with the plurality of second signals. In another aspect, a first subset of the plurality of TCIs are associated with a single-target beam indication. In another aspect, a second subset of the plurality of TCIs are associated with a multiple-target beam indication and non-overlapping with the second subset. In another aspect, the first TCI activated for the first signal is within the first subset, and the second TCI activated for the plurality of second signals is within the second subset.

FIG. 11 is a flow diagram illustrating a beam indication communication method 1100 according to one or more aspects of the present disclosure. Aspects of the method 1100 can be executed by a computing device (e.g., a processor, processing circuit, and/or other suitable component) of a wireless communication device or other suitable means for performing the blocks. For instance, the wireless communication device may be a UE 900. The UE 900 may utilize one or more components, such as the processor 802, the memory 804, the beam module 808, the transceiver 810, the modem 812, the RF unit 814, and/or the one or more antennas 816, to execute the blocks of method 1100. The method 1100 may employ similar mechanisms as described in FIGS. 5-7. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1102, the UE 900 receives, from a BS (e.g., the network entity 800), a configuration for a plurality of transmission configuration indications (TCIs). In some aspects, receiving the configuration for the plurality of TCIs may include receiving an RRC configuration including one or more sets of pools of TCIs. The RRC configuration may indicate, for each TCI state, the corresponding communication signals and/or reference signals, and the corresponding QCL states. The UE 900 may utilize one or more components, such as the processor 902, the memory 904, the beam module 908, the transceiver 910, the modem 912, the RF unit 914, and/or the one or more antennas 916, to execute the actions of block 1102.

At block 1104, the UE 900 receives, from the BS, a first activation of a first TCI of the plurality of TCIs for a first signal. In some aspects, receiving the first activation includes receiving a first media access control-control element (MAC-CE) indicating the first activation of the first TCI associated with the first signal. In some aspects, receiving the first activation includes receiving a first downlink control information (DCI) indicating the first activation of the first TCI associated with the first signal. In some aspects, receiving the first activation includes receiving an indication of the first activation based on a type of the MAC-CE and/or the DCI. In other aspects, receiving the first activation may include receiving an indication of the first activation based on a field or value of the MAC-CE and/or the DCI. The UE 900 may utilize one or more components, such as the processor 902, the memory 904, the beam module 908, the transceiver 910, the modem 912, the RF unit 914, and/or the one or more antennas 916, to execute the actions of block 1104.

At block 1106, the UE 900 receives, from the BS, a second activation of a second TCI of the plurality of TCIs for a plurality of second signals. In some aspects, receiving the first activation includes receiving a second MAC-CE indicating the second activation of the second TCI associated with the second signal. In some aspects, receiving the second activation includes receiving a second DCI indicating the second activation of the second TCI associated with the second signal. In some aspects, receiving the second activation includes receiving an indication of the second activation based on a type of the MAC-CE and/or the DCI. In other aspects, receiving the second activation may include receiving an indication of the second activation based on a field or value of the MAC-CE and/or the DCI. The UE 900 may utilize one or more components, such as the processor 902, the memory 904, the beam module 908, the transceiver 910, the modem 912, the RF unit 914, and/or the one or more antennas 916, to execute the actions of block 1106.

At block 1108, the UE 900 communicates, based on the first TCI, the first signal. In some aspects, communicating the first signal may include transmitting one or more DL communications and/or DL reference signals based on the first TCI, or receiving one or more UL communications and/or UL reference signals based on the first TCI. For example, communicating the first signal may include transmitting a DL communication signal (e.g., PDSCH communication) and/or a DL reference signal (e.g., CSI-RS, SRS, etc.). The UE 900 may utilize one or more components, such as the processor 902, the memory 904, the beam module 908, the transceiver 910, the modem 912, the RF unit 914, and/or the one or more antennas 916, to execute the actions of block 1108.

At block 1110, the UE 900 communicates, based on the second TCI, at least one of the plurality of second signals. In some aspects, communicating the second signal may include transmitting one or more DL communications and/or DL reference signals based on the second TCI, and/or receiving one or more UL communications and/or UL reference signals based on the second TCI. The UE 900 may utilize one or more components, such as the processor 902, the memory 904, the beam module 908, the transceiver 910, the modem 912, the RF unit 914, and/or the one or more antennas 916, to execute the actions of block 1110.

In some aspects, the first signal may be associated with a single-target communication, and the at least one of the plurality of second signals may be associated with a multi-target communication. In some aspects, the plurality of second signals be by associated with a UL/DL common TCI configuration. For example, in some aspects, the second TCI includes a joint uplink/downlink (UL/DL) common TCI state indicating a beam pair for: at least one of a DL channel signal or a DL reference signal; and at least one of a UL channel signal or a UL reference signal. In some aspects, the second TCI includes a DL common TCI state indicating a common beam for at least two of a first DL channel signal, a second DL channel signal, a first DL reference signal, or a second DL reference signal. In some aspects, the second TCI includes a DL common TCI state indicating a common beam for at least two of a first UL channel signal, a second UL channel signal, a first UL reference signal, or a second UL reference signal.

In some aspects, the first TCI associated with the first signal and the second TCI associated with the plurality of second signals correspond to a same common TCI or a same spatial filter for directional beamforming. In some aspects, the configuration for the plurality of TCIs further indicates that the common TCI is associated with a single-target beam indication and a multiple-target beam indication at the same time.

In a further aspect, the method 1000 further includes transmitting an indication indicating that the common TCI is associated with a single-target beam indication and a multiple target beam indication at the same time. In another aspect, the method 1000 includes transmitting an indication indicating that the common TCI is associated with a single-target beam indication or a multiple-target beam indication.

In some aspects, the configuration for the plurality of TCIs further indicates: a first TCI pool associated with the single-target beam indication and including the first subset of the plurality of TCIs, and a second TCI pool associated with a multi-target beam indication and including the second subset of the plurality of TCIs. In another aspect, the configuration for the plurality of TCIs further indicates a first plurality of TCI state identifiers (IDs) associated with the single-target beam indication, where each of the first plurality of TCI state ID identifies one TCI of the first subset of the plurality of TCIs. In another aspect, the configuration for the plurality of TCIs further indicates a second plurality of TCI state IDs associated with the multiple-target beam indication, where each of the second plurality of TCI state IDs identifies one TCI of the second subset of the plurality of TCIs.

In some aspects, the first TCI associated with the first signal is different than the second TCI associated with the plurality of second signals. In another aspect, a first subset of the plurality of TCIs are associated with a single-target beam indication. In another aspect, a second subset of the plurality of TCIs are associated with a multiple-target beam indication and non-overlapping with the second subset. In another aspect, the first TCI activated for the first signal is within the first subset, and the second TCI activated for the plurality of second signals is within the second subset.

Information and signals may be represented using any of a variety of different technologies and techniques. For instance, data, instructions, commands, information, signals, bits, symbols, and chips that may be referenced throughout the above description may be represented by voltages, currents, electromagnetic waves, magnetic fields or particles, optical fields or particles, or any combination thereof.

Other aspects of the present disclosure include:

Clause 1: A method for wireless communication performed by a wireless communication device, the method comprising: communicating a configuration for a plurality of transmission configuration indications (TCIs); communicating a first activation of a first TCI of the plurality of TCIs for a first signal; communicating a second activation of a second TCI of the plurality of TCIs for a plurality of second signals; communicating, based on the first TCI, the first signal; and communicating, based on the second TCI, at least one of the plurality of second signals.

Clause 2: The method of clause 1, wherein the second TCI includes a joint uplink/downlink (UL/DL) common TCI state indicating a beam pair for: at least one of a DL channel signal or a DL reference signal; and at least one of a UL channel signal or a UL reference signal. 3. The method of clause 1, wherein the second TCI includes a DL common TCI state indicating a common beam for at least two of a first DL channel signal, a second DL channel signal, a first DL reference signal, or a second DL reference signal.

Clause 4. The method of clause 1, wherein the second TCI includes a DL common TCI state indicating a common beam for at least two of a first UL channel signal, a second UL channel signal, a first UL reference signal, or a second UL reference signal.

Clause 5. The method of any of clauses 1-4, wherein: the communicating the first activation comprises: communicating a first radio resource configuration (RRC) configuration indicating the first activation of the first TCI associated with the first signal; and the communicating the second activation comprises: communicating a second RRC configuration including the second activation of the second TCI associated with the plurality of second signals.

Clause 6. The method of any of clauses 1-4, wherein: the communicating the first activation comprises: communicating a first medium access control-control element (MAC-CE) indicating the first activation of the first TCI associated with the first signal; and the communicating the second activation comprises: communicating a second MAC-CE including the second activation of the second TCI associated with the plurality of second signals.

Clause 7. The method of clause 6, wherein: a type of the first MAC-CE indicates the first activation of the first TCI associated with the first signal; and a type of the second MAC-CE indicates the second activation of the second TCI associated with the second signal.

Clause 8. The method of clause 6, wherein: the first MAC-CE comprises a first field indicating the first activation of the first TCI associated with the first signal; and the second MAC-CE comprises a second field indicating the second activation of the second TCI associated with the second signal.

Clause 9. The method of any of clauses 1-4, wherein: the communicating the first activation comprises: communicating a first downlink control information (DCI) indicating the first activation of the first TCI associated with the first signal; and the communicating the second activation comprises: communicating a second DCI including the second activation of the second TCI associated with the plurality of second signals.

Clause 10. The method of clause 9, wherein: a type of the first DCI indicates the first activation of the first TCI associated with the first signal; and a type of the second DCI indicates the second activation of the second TCI associated with the second signal.

Clause 11. The method of clause 9, wherein: the first DCI comprises a first field indicating the first activation of the first TCI associated with the first signal; and the second DCI comprises a second field indicating the second activation of the second TCI associated with the second signal.

Clause 12. The method of any of clauses 1-11, wherein the first TCI associated with the first signal and the second TCI associated with the plurality of second signals correspond to a same common TCI or a same spatial filter for directional beamforming.

Clause 13. The method of clause 12, wherein the configuration for the plurality of TCIs further indicates that the common TCI is associated with a single-target beam indication and a multiple-target beam indication at the same time.

Clause 14. The method of clause 12, further comprising: communicating an indication indicating that the common TCI is associated with a single-target beam indication and a multiple-target beam indication at the same time.

Clause 15. The method of clause 12, further comprising: communicating an indication indicating that the common TCI is associated with a single-target beam indication or a multiple-target beam indication.

Clause 16. The method of any of clauses 1-15, wherein the first TCI associated with the first signal is different than the second TCI associated with the plurality of second signals.

Clause 17. The method of any of clauses 1-16, wherein a first subset of the plurality of TCIs are associated with a single-target beam indication, wherein a second subset of the plurality of TCIs are associated with a multiple-target beam indication and non-overlapping with the second subset, wherein the first TCI activated for the first signal is within the first subset, and wherein the second TCI activated for the plurality of second signals is within the second subset.

Clause 18. The method of clause 17, wherein the configuration for the plurality of TCIs further indicates: a first TCI pool associated with the single-target beam indication and including the first subset of the plurality of TCIs; and a second TCI pool associated with a multi-target beam indication and including the second subset of the plurality of TCIs.

Clause 19. The method of clause 17, wherein the configuration for the plurality of TCIs further indicates: a first plurality of TCI state identifiers (IDs) associated with the single-target beam indication, wherein each of the first plurality of TCI state ID identifies one TCI of the first subset of the plurality of TCIs; and a second plurality of TCI state IDs associated with the multiple-target beam indication, wherein each of the second plurality of TCI state IDs identifies one TCI of the second subset of the plurality of TCIs.

Clause 20. The method of any of clauses 1-19, wherein: the wireless communication device includes a user equipment (UE); the communicating the configuration comprises receiving the configuration; the communicating the first activation comprises receiving the first activation; and the communicating the second activation comprises receiving the second activation.

Clause 21. The method of any of clauses 1-19, wherein: the wireless communication device includes a network entity; the communicating the configuration comprises transmitting the configuration; the communicating the first activation comprises transmitting the first activation; and the communicating the second activation comprises transmitting the second activation.

Clause 22. A wireless communication device, comprising: a transceiver; and a processor in communication with the transceiver, wherein the wireless communication device is configured to perform the actions of any of clauses 1-21. 23. A non-transitory computer-readable medium having program code recorded thereon, the program code comprising: code for causing a wireless communication device to perform the actions of any of clauses 1-21.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For instance, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for instance, a list of items prefaced by a phrase such as "at least one of" or "one or more of") indicates an inclusive list such that, for instance, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some aspects thereof, but rather, should be fully commensurate with that of the claims appended hereafter and their functional equivalents.

What is claimed is:

1. A method for wireless communication performed at a wireless communication device, the method comprising:
    communicating a configuration associated with a plurality of transmission configuration indications (TCIs);
    communicating a first indication of a first TCI of the plurality of TCIs, wherein the first indication indicates that the first TCI is associated exclusively with a single first signal;
    communicating a second indication of a second TCI of the plurality of TCIs, wherein the second indication indicates that the second TCI is associated with a plurality of second signals, and wherein the first indication and the second indication are active concurrently during a same time period;
    communicating, based on the first TCI, the single first signal; and communicating, based on the second TCI, the plurality of second signals, wherein the first TCI associated with the single first signal and the second TCI associated with the plurality of second signals correspond to a common TCI.

2. The method of claim 1,
wherein the second TCI includes a joint uplink/downlink (UL/DL) common TCI state indicating a beam pair associated with:
    at least one of a DL channel signal or a DL reference signal, and
    at least one of a UL channel signal or a UL reference signal.

3. The method of claim 1,
wherein the second TCI includes a downlink (DL) common TCI state indicating a common beam associated with at least two of: a first DL channel signal, a second DL channel signal, a first DL reference signal, or a second DL reference signal.

4. The method of claim 1,
wherein the second TCI includes a uplink (UL) common TCI state indicating a common beam associated with at least two of a first UL channel signal, a second UL channel signal, a first UL reference signal, or a second UL reference signal.

5. The method of claim 1, wherein:
the communicating the first indication comprises:
    communicating a first radio resource configuration (RRC) configuration comprising the first indication, and
the communicating the second indication comprises:
    communicating a second RRC configuration comprising the second indication.

6. The method of claim 1, wherein:
the communicating the first indication comprises:
    communicating a first medium access control-control element (MAC-CE) comprising the first indication, and
the communicating the second indication comprises:
    communicating a second MAC-CE comprising the second indication.

7. The method of claim 6, wherein:
a type of the first MAC-CE indicates the first indication, and
a type of the second MAC-CE indicates the second indication.

8. The method of claim 6, wherein:
the first MAC-CE comprises a first field comprising the first indication, and
the second MAC-CE comprises a second field comprising the second indication.

9. The method of claim 1, wherein:
the communicating the first indication comprises:
    communicating a first downlink control information (DCI) comprising the first indication, and
the communicating the second indication comprises:
    communicating a second DCI comprising the second indication.

10. The method of claim 1, further comprising:
communicating an indication indicating that the common TCI is associated with a single-target beam indication or a multiple-target beam indication.

11. The method of claim 1,
wherein a first subset of the plurality of TCIs are associated with a single-target beam indication, and
wherein a second subset of the plurality of TCIs are associated with a multiple-target beam indication and non-overlaps with the first subset of the plurality of TCIs,
    wherein the first TCI is within the first subset of the plurality of TCIs, and
    wherein the second TCI is within the second subset of the plurality of TCIs.

12. The method of claim 11,
wherein the configuration associated with the plurality of TCIs further indicates:
    a first TCI pool associated with the single-target beam indication and includes the first subset of the plurality of TCIs, and
    a second TCI pool associated with multiple-target beam indication and includes the second subset of the plurality of TCIs.

13. The method of claim 1, wherein:
the wireless communication device includes a user equipment (UE),
communicating the configuration comprises receiving the configuration,
communicating the first indication comprises receiving the first indication, and
communicating the second indication comprises receiving the second indication.

14. The method of claim 1, wherein:
the wireless communication device includes a network entity,
communicating the configuration comprises transmitting the configuration,
communicating the first indication comprises transmitting the first indication, and
communicating the second indication comprises transmitting the second indication.

15. The method of claim 1,
wherein the communicating the first indication and the communicating the second indication occur simultaneously.

16. A wireless node, comprising:
at least one transceiver;
at least one memory comprising instructions; and
at least one processor configured to execute the instructions to cause the wireless node to:
    communicate, via the at least one transceiver, a configuration associated with a plurality of transmission configuration indications (TCIs);
    communicate, via the at least one transceiver, a first indication of a first TCI of the plurality of TCIs, wherein the first indication indicates that the first TCI is associated exclusively with a single first signal;

communicate, via the at least one transceiver, a second indication of a second TCI of the plurality of TCIs, wherein the second indication indicates that the second TCI is associated with a plurality of second signals, and wherein the first indication and the second indication are active concurrently during a same time period;

communicate, via the at least one transceiver and based on the first TCI, the single first signal; and communicate, via the at least one transceiver and based on the second TCI, the plurality of second signals, wherein:

the first TCI associated with the single first signal and the second TCI associated with the plurality of second signals correspond to a common TCI.

17. The wireless node of claim 16,
wherein the second TCI includes a joint uplink/downlink (UL/DL) common TCI state indicating a beam pair associated with:
at least one of a DL channel signal or a DL reference signal; and
at least one of a UL channel signal or a UL reference signal.

18. The wireless node of claim 16, wherein:
to communicate the first indication, the at least one processor is configured to execute the instructions to cause the wireless node to:
communicate, via the at least one transceiver, a first radio resource configuration (RRC) configuration comprising the first indication, and
to communicate the second indication, the at least one processor is configured to execute the instructions to cause the wireless node to:
communicate, via the at least one transceiver, a second RRC configuration comprising the second indication.

19. The wireless node of claim 16, wherein:
to communicate the first indication, the at least one processor is configured to execute the instructions to cause the wireless node to:
communicate, via the at least one transceiver, a first medium access control-control element (MAC-CE) comprising the first indication, and
to communicate the second indication, the at least one processor is configured to execute the instructions to cause the wireless node to:
communicate, via the at least one transceiver, a second MAC-CE comprising the second indication.

20. The wireless node of claim 19, wherein:
a type of the first MAC-CE indicates the first indication, and
a type of the second MAC-CE indicates the second indication.

21. The wireless node of claim 19, wherein:
the first MAC-CE comprises a first field comprising the first indication, and
the second MAC-CE comprises a second field comprising the second indication.

22. The wireless node of claim 16, wherein:
to communicate the first indication, the at least one processor is configured to execute the instructions to cause the wireless node to:

communicate, via the at least one transceiver, a first downlink control information (DCI) comprising the first indication, and
to communicate the second indication, the at least one processor is configured to execute the instructions to cause the wireless node to:
communicate, via the at least one transceiver, a second DCI comprising the second indication.

23. The wireless node of claim 16,
wherein the at least one processor is further configured to execute the instructions to cause the wireless node to:
communicate, via the at least one transceiver, an indication indicating that the common TCI is associated with a single-target beam indication or a multiple-target beam indication.

24. The wireless node of claim 16,
wherein a first subset of the plurality of TCIs are associated with a single-target beam indication, and
wherein a second subset of the plurality of TCIs are associated with a multiple-target beam indication and non-overlaps with the first subset of the plurality of TCIs,
wherein the first TCI is within the first subset of the plurality of TCIs, and
wherein the second TCI is within the second subset of the plurality of TCIs.

25. The wireless node of claim 24,
wherein the configuration associated with the plurality of TCIs further indicates:
a first TCI pool associated with the single-target beam indication and including the first subset of the plurality of TCIs, and
a second TCI pool associated with a multi-target beam indication and including the second subset of the plurality of TCIs.

26. The wireless node of claim 16, wherein:
the wireless node comprises a user equipment (UE),
to communicate the configuration, the at least one processor is configured to execute the instructions to cause the UE to:
receive, via the at least one transceiver, the configuration,
to communicate the first indication, the at least one processor is configured to execute the instructions to cause the UE to:
receive, via the at least one transceiver, the first indication, and
to communicate the second indication, the at least one processor is configured to execute the instructions to cause the UE to:
receive, via the at least one transceiver, the second indication.

27. The wireless node of claim 16, wherein:
the wireless node comprises a network entity,
to communicate the configuration, the at least one processor is configured to execute the instructions to cause the network entity to:
transmit, via the at least one transceiver, the configuration,
to communicate the configuration, the at least one processor is configured to execute the instructions to cause the network entity to:
transmit, via the at least one transceiver, the first indication, and
to communicate the configuration, the at least one processor is configured to execute the instructions to cause the network entity to:

transmit, via the at least one transceiver, the second indication.

28. The wireless node of claim 16, wherein the first indication and the second indication are simultaneously communicated.

29. A non-transitory computer-readable medium storing a set of instructions, the set of instructions comprising:

one or more instructions that, when executed by one or more processors of a wireless node, cause the wireless node to:

communicate a configuration associated with a plurality of transmission configuration indications (TCIs);

communicate a first indication of a first TCI of the plurality of TCIs, wherein the first indication indicates that the first TCI is associated exclusively with a single first signal;

communicate a second indication of a second TCI of the plurality of TCIs, wherein the second indication indicates that the second TCI is associated with a plurality of second signals, and wherein the first indication and the second indication are active concurrently during a same time period;

communicate, based on the first TCI, the single first signal; and communicate, based on the second TCI, the plurality of second signals, wherein:

the first TCI associated with the single first signal and the second TCI associated with the plurality of second signals correspond to a common TCI.

30. A wireless node, comprising:

means for communicating a configuration associated with a plurality of transmission configuration indications (TCIs);

means for communicating a first indication of a first TCI of the plurality of TCIs, wherein the first indication indicates that the first TCI is associated exclusively with a single first signal;

means for communicating a second indication of a second TCI of the plurality of TCIs, wherein the second indication indicates that the second TCI is associated with a plurality of second signals, and wherein the first indication and the second indication are active concurrently during a same time period;

means for communicating, based on the first TCI, the single first signal; and means for communicating, based on the second TCI, the plurality of second signals, wherein:

the first TCI associated with the single first signal and the second TCI associated with the plurality of second signals correspond to a common TCI.

* * * * *